(12) United States Patent
Sun et al.

(10) Patent No.: US 8,630,580 B2
(45) Date of Patent: Jan. 14, 2014

(54) ANALOG SPACE-TIME RELAY METHOD AND APPARATUS FOR A WIRELESS COMMUNICATION RELAY CHANNEL

(75) Inventors: Sumei Sun, Singapore (SG); Chau Yuen, Singapore (SG); Quee Tony Seng Quek, Singapore (SG)

(73) Assignee: Agency for Science, Technology and Research, Connexis (SG)

( * ) Notice: Subject to any disclaimer, the term of this patent is extended or adjusted under 35 U.S.C. 154(b) by 434 days.

(21) Appl. No.: 13/059,676

(22) PCT Filed: Aug. 18, 2009

(86) PCT No.: PCT/SG2009/000285
§ 371 (c)(1),
(2), (4) Date: May 6, 2011

(87) PCT Pub. No.: WO2010/021597
PCT Pub. Date: Feb. 25, 2010

(65) Prior Publication Data
US 2012/0028570 A1    Feb. 2, 2012

Related U.S. Application Data

(60) Provisional application No. 61/089,617, filed on Aug. 18, 2008.

(51) Int. Cl.
*H04W 24/00* (2009.01)

(52) U.S. Cl.
USPC ............ 455/9; 455/7; 370/315; 370/328; 375/295

(58) Field of Classification Search
USPC .................................................. 455/9
See application file for complete search history.

(56) References Cited

U.S. PATENT DOCUMENTS 5,561,468 A    10/1996 Bryan et al.

6,106,562 A *    8/2000 Teter et al. .................. 703/12

(Continued)

FOREIGN PATENT DOCUMENTS

EP            1615354 A2    1/2006
WO    2006121381 A1    11/2006

(Continued)

OTHER PUBLICATIONS

Li et al., "A Simple Alamouti Space-Time Transmision Scheme for Asynchronous Cooperative Systems", Nov. 2007, IEEE Signall Processing Letters, vol. 14, No. 11, 4 pages.*

(Continued)

*Primary Examiner* — Hai V Nguyen
(74) *Attorney, Agent, or Firm* — Kramer Levin Naftalis & Frankel LLP

(57) ABSTRACT

An analog space-time relay method and apparatus for a wireless communication relay channel is disclosed herein. In a specific embodiment, the analog space-time relay channel (100) includes first and second relay antennas (122,124) arranged to relay an information signal transmitted from a source station (110) to a destination station (130). The method comprises the steps of: (i) receiving a first symbol sequence at the first relay antenna (122), the first symbol sequence comprising the information signal and a first noise element; (ii) receiving a second symbol sequence at the second relay antenna (124), the second symbol sequence comprising the information signal and a second noise element; (iii) transmitting a first signal by the first relay antenna (122), the first signal being associated with the second symbol sequence received at the second relay antenna (124); (iv) transmitting a second signal by the second relay antenna (124), the second signal being associated with the first symbol sequence received at the first relay antenna (122). Method and apparatus for deriving a complex conjugate for a symbol sequence and a frame header structure are also disclosed.

60 Claims, 8 Drawing Sheets

(56) References Cited

U.S. PATENT DOCUMENTS

| | | | |
|---|---|---|---|
| 6,169,723 B1 | 1/2001 | Fertner et al. | |
| 6,510,173 B1* | 1/2003 | Garmonov et al. | 375/141 |
| 6,700,866 B1* | 3/2004 | Heinonen et al. | 370/208 |
| 6,768,714 B1* | 7/2004 | Heinonen et al. | 370/208 |
| 7,020,072 B1* | 3/2006 | Li et al. | 370/208 |
| 7,088,782 B2* | 8/2006 | Mody et al. | 375/260 |
| 7,336,601 B2* | 2/2008 | Wu et al. | 370/208 |
| 7,336,930 B2* | 2/2008 | Larsson et al. | 455/63.1 |
| 7,394,754 B2* | 7/2008 | Li et al. | 370/210 |
| 7,406,060 B2* | 7/2008 | Periyalwar et al. | 370/328 |
| 7,508,798 B2* | 3/2009 | Tong et al. | 370/337 |
| 7,606,531 B2* | 10/2009 | Asai et al. | 455/11.1 |
| 7,616,557 B2* | 11/2009 | Yeh et al. | 370/208 |
| 7,636,406 B2* | 12/2009 | Leshem et al. | 375/347 |
| 7,639,639 B2* | 12/2009 | Herdin | 370/315 |
| 7,653,141 B2* | 1/2010 | Mo et al. | 375/260 |
| 7,680,211 B1* | 3/2010 | von der Embse | 375/299 |
| 7,706,458 B2* | 4/2010 | Mody et al. | 375/260 |
| 7,720,020 B2* | 5/2010 | Larsson | 370/315 |
| 7,720,166 B2* | 5/2010 | Lomnitz et al. | 375/262 |
| 7,738,835 B2* | 6/2010 | Oh et al. | 455/7 |
| 7,760,648 B2* | 7/2010 | Banerjee et al. | 370/236 |
| 7,853,196 B2* | 12/2010 | Nguyen et al. | 455/3.01 |
| 7,890,049 B2* | 2/2011 | Chang et al. | 455/11.1 |
| 7,903,617 B2* | 3/2011 | Liu et al. | 370/335 |
| 7,907,677 B2* | 3/2011 | Li et al. | 375/267 |
| 7,979,024 B2* | 7/2011 | Zheng | 455/25 |
| 8,000,650 B2* | 8/2011 | Chang et al. | 455/11.1 |
| 8,014,470 B2* | 9/2011 | Lee et al. | 375/340 |
| 8,031,686 B2* | 10/2011 | Li et al. | 370/342 |
| 8,045,463 B2* | 10/2011 | Radunovic et al. | 370/231 |
| 8,059,732 B2* | 11/2011 | Papadopoulos et al. | 375/260 |
| 8,059,750 B2* | 11/2011 | Xin et al. | 375/298 |
| 8,289,894 B2* | 10/2012 | Choudhury | 370/315 |
| 8,451,929 B2* | 5/2013 | Agee et al. | 375/267 |
| 8,472,868 B2* | 6/2013 | Mu et al. | 455/7 |
| 8,483,324 B2* | 7/2013 | Arar | 375/340 |
| 8,484,272 B2* | 7/2013 | Gore et al. | 708/400 |
| 8,520,569 B2* | 8/2013 | Periyalwar et al. | 370/310 |
| 2003/0133457 A1* | 7/2003 | Ono et al. | 370/395.4 |
| 2004/0266339 A1* | 12/2004 | Larsson | 455/7 |
| 2005/0014464 A1* | 1/2005 | Larsson | 455/11.1 |
| 2006/0003697 A1* | 1/2006 | Asai et al. | 455/11.1 |
| 2006/0229017 A1* | 10/2006 | Larsson et al. | 455/63.1 |
| 2006/0270363 A1* | 11/2006 | Sandhu et al. | 455/101 |
| 2007/0010196 A1* | 1/2007 | Periyalwar et al. | 455/7 |
| 2007/0160014 A1* | 7/2007 | Larsson | 370/338 |
| 2007/0292131 A1 | 12/2007 | Slobodyanyuk et al. | |
| 2008/0279135 A1* | 11/2008 | Periyalwar et al. | 370/315 |
| 2009/0041148 A1* | 2/2009 | Li et al. | 375/267 |
| 2010/0020896 A1* | 1/2010 | Willems et al. | 375/295 |
| 2010/0208716 A1* | 8/2010 | Mujtaba et al. | 370/342 |
| 2010/0260240 A1* | 10/2010 | Wang | 375/214 |
| 2010/0309829 A1* | 12/2010 | Phan et al. | 370/281 |
| 2011/0058630 A1* | 3/2011 | Osseiran et al. | 375/316 |
| 2011/0069780 A1* | 3/2011 | Novak et al. | 375/295 |
| 2011/0207399 A1* | 8/2011 | Thiagarajan et al. | 455/21 |
| 2011/0296271 A1* | 12/2011 | Tan et al. | 714/752 |
| 2012/0294224 A1* | 11/2012 | Silva et al. | 370/315 |
| 2012/0300680 A1* | 11/2012 | Pietsch et al. | 370/279 |

FOREIGN PATENT DOCUMENTS

| | | |
|---|---|---|
| WO | WO 2006/121381 A1 | 11/2006 |
| WO | WO 2008/097036 A1 | 8/2008 |

OTHER PUBLICATIONS

Rajan et al., "OFDM based Distributed Space Time Coding for Asynchronous Relay Networks", Apr. 19, 2008, arXiv:0804.2998v2, 5 pages.*

"Shift Register Sequences" by Aegean Park Press, Chapter III, Sequences with Randomness Properties, pp. 24-89.

Bhaskar, D. Rao, et al., "Performance Analysis of ESPRIT and TAM in Determining the Direction of Arrival of Plane Waves in Noise", IEEE Xplore, 1989, pp. 1987-1990.

Yindi, Jing et al., "Distributed Space-Time Coding in Wireless Relay Networks", IEEE Transactions on Wireless Communications, vol. 5, No. 12, Dec. 2006.

Zheng, Li et al., "A Simple Alamouti Space-Time Transmission Scheme for Asynchronous Cooperative Systems", IEEE Signal Processing Letters, vol. 14, No. 11, Nov. 2007.

Heimiller, R.C., et al., "IRE Transactions on Information Theory Phase Shift Pluse Codes with Good Periodic Correlation Properties", IEEE Xplore, Dec. 29, 2009, pp. 254-257.

Popovski, Petar, et al., "Physical Networking Coding in Two-Way Wireless Relay Channels", Dept. of Electronic Systes, Aalborg University. Date Unknown.

Jing, Yindi, "Using Orthogonal and Quasi-Orhogonal Designs in Wireless Relay Networks", IEEE, vol. 53, No. 11, Nov. 11, 2007.

Soldani, David, et al., "Wireless Relays for Broadband Access", Radio Communications Series, IEEE Communications Magazine, Mar. 2008, pp. 58-66.

Katti Sachin, et al., "XORs in the Air: Practical Wireless Network Coding", MIT CSAIL, University of Cambridge, Sep. 11-15, 2006, Pisa, Italy, pp. 243-254.

Chinese Search Report; Application No. 200980131935.0 filed Aug. 18, 2009; Date of Mailing Feb. 23, 2013.

Lee et al.: "Decouple-and-Forward Relaying for Dual-Hop Alamouti Transmissions." IEEE, vol. 12, No. 2, Feb. 2008, pp. 97-99.

Duong et al.: "Symbol Error Probability of Distributed-Alamouti Scheme in Wireless Relay Networks." IEEE, 2008, pp. 648-652.

* cited by examiner

ANALOG SPACE-TIME RELAY METHOD AND APPARATUS FOR A WIRELESS COMMUNICATION RELAY CHANNEL

CROSS-REFERENCE TO RELATED APPLICATIONS

The present application is one of two patent applications claiming priority from U.S. provisional patent application No. 61/089,617. The present patent application relates generally to space-time coding, whereas the other patent application relates particularly to the usage of cyclic prefixes. The techniques described in the respective two patent applications are independent since either can be used without the other, although it is equally possible to construct systems which combine techniques from the respective two patent applications.

FIELD AND BACKGROUND OF THE INVENTION

This invention relates to an analog space-time relay method and apparatus for a wireless communication channel.

Wireless relays have shown potential for extending communication range and providing good quality of experience. In general, there are two broad relay schemes which can be categorized based on the processing done at the relay stations: digital domain processing and analog domain processing. The "decode and forward" (DNF) scheme is a digital domain processing scheme that has been shown to remove noise at the relay station, although it demands intensive signal processing at the relay nodes. The DNF scheme has also been classified as a "regenerative" relaying scheme where the signal has to be "regenerated" for transmission. The signal received at the relay station from the source is decoded and where errors are present in the decoded signal, these errors will be propagated from the relay station to the destination.

In relation to analog signal processing schemes, the "amplify and forward" (ANF) is an analog scheme that is very simple, but has shown a disadvantage where noise collected at the relay is amplified and transmitted to the destination along with the desired signal.

Another way of performing relaying would be to use a distributed space-time coded (DSTC) scheme where higher diversity may be achieved than that of simple ANF and DNF. DSTC can be implemented using either ANF or DNF schemes. DSTC however suffers from the same disadvantages as that of ANF or DNF i.e. when implemented using ANF, noise collected at the relay is amplified and transmitted on to the destination, and when implemented using DNF, decoding errors at the relay station are propagated from the relay station to the destination.

It is an object of the present invention to provide an analog space-time relay method and apparatus which addresses at least one of the problems of the prior art and/or to provide the public with a useful choice.

SUMMARY OF THE INVENTION

In a specific expression of the invention, there is provided an analog space-time relay method for a wireless communication relay channel, the wireless communication relay channel including first and second relay antennas arranged to relay an information signal transmitted from a source station to a destination station, the method comprising the steps of:
(i) receiving a first symbol sequence at the first relay antenna, the first symbol sequence comprising the information signal and a first noise element;
(ii) receiving a second symbol sequence at the second relay antenna, the second symbol sequence comprising the information signal and a second noise element;
(iii) transmitting a first signal by the first relay antenna, the first signal being associated with the second symbol sequence received at the second relay antenna;
(iv) transmitting a second signal by the second relay antenna, the second signal being associated with the first symbol sequence received at the first relay antenna.

In one variation, preferably, the second symbol sequence includes a complex conjugate of the information symbol, and the method further comprises the step of negating the complex conjugate of the information symbol for deriving the first signal. The method may further comprise the step of combining the negated complex conjugate of the information signal and the first symbol sequence for deriving the first signal. The method may further comprise the step of combining the first and second symbol sequences to obtain the second signal.

Advantageously, the method further comprises the step of encoding the first and second signals using Alamouti coding prior to the respective transmissions.

The first expression may be employed as a training scheme and in this case, the information symbol may include at least one training signal and the method may further comprise the steps of: encoding the first and second received symbol sequences using Alamouti coding to obtain the first and second signals for transmission by the respective relay antennas. Preferably, the method further comprises the step of, at the destination station, negating the first and second signals to obtain channel estimates for the wireless communication relay channel. The method may further comprise the step of, at the destination station, calculating a mean of the first and second signals to obtain channel estimates for the wireless communication relay channel.

In a second variation, the information symbol may include two consecutive symbols. In such a case, the first symbol sequence may include a combination of the two consecutive symbols and the second symbol sequence may include a difference of the two consecutive symbols.

Advantageously, the method further comprises the steps of, combining the first and second symbol sequence for deriving the first signal for the first relay antenna; combining the first and second symbol sequence at the second relay antenna for deriving the second signal for the second relay antenna. The method may further comprise the steps of encoding the combined first and second symbol sequences using Alamouti coding to form the first and second signals for transmission by the respective relay antennas.

In a variation to the training scheme, the information symbol may include at least one training signal, and the first signal includes a conjugate of the second symbol sequence received at the second relay antenna. The method may further comprise the step of: re-transmitting the first symbol sequence by the first relay antenna at a symbol interval different from the transmission of the first signal. The second signal may include a negative conjugate of the first symbol sequence received at the first relay antenna.

Preferably, the method may comprise the step of: re-transmitting the second symbol sequence by the second relay antenna at a symbol interval different from the transmission of the second signal. The method may further comprise the step of, at the destination station, negating the first and second signals to obtain channel estimates for the wireless communication relay channel.

In this training variation, the method may further comprise the step of, at the destination station, calculating a mean of the first and second signals to obtain channel estimates for the wireless communication relay channel.

As an alternative training scheme, the first symbol sequence may be re-transmitted by the first relay antenna over first and second symbols intervals, and the method may further comprise the step of transmitting a negative conjugate of the second symbol sequence received at the second relay antenna over a third symbol interval. The first may be transmitted over a fourth symbol interval.

The method may further comprise the steps of, simultaneously, transmitting a negative second symbol sequence by the second relay antenna over the first symbol interval and re-transmitting the second symbol sequence by the second relay antenna over the second symbol interval. The second signal may include the negative conjugate of the first symbol sequence is transmitted over the third and fourth symbol intervals.

In a third variation, the information symbol may include even number of symbols, and the method may further comprise the step of combining the first and second symbol sequences to obtain the first and second signals at the respective antennas.

Advantageously, the method may further comprise the step of encoding the first and second signals using Alamouti coding prior to the respective transmissions.

As a further training scheme variation, the method may further comprise the steps of combining the first and second symbol sequences to form the first signal and transmitting the first signal over a first symbol interval. Preferably, the method may further comprise the steps of: negating the first signal; and transmitting the negated first signal over a second symbol interval.

The method may further comprise the steps of: obtaining a complex conjugate of the first signal; and transmitting the complex conjugate of the first signal over a third and fourth symbol interval. The method may further comprise the steps of, simultaneously, combining the first and second sequences to form the second signal, obtaining a complex conjugate of the second signal, negating the complex conjugate of the second signal, and transmitting the negated complex conjugate of the second signal over the first and second symbol intervals.

Preferably, the second signal is transmitted over the third symbol interval. In such a case, the method may further comprise the steps of negating the second signal and transmitting the negated second signal over a fourth symbol interval.

In a second specific expression of the invention, there is provided an analog space-time relay method for a wireless communication relay channel, the wireless communication relay channel including first and second relay antennas arranged to relay an information signal transmitted from a source station to a destination station, the method comprising the steps of:
(i) receiving a first symbol sequence at the first relay antenna and the first relay antenna retransmitting the first symbol sequence as a first signal, the first symbol sequence comprising the information signal and a first noise element;
(ii) receiving a second symbol sequence at the second relay antenna, the second symbol sequence comprising the information signal and a second noise element;
(iii) transmitting a second signal by the second relay antenna, the second signal being a reordering of the second symbol sequence.

Preferably, the second signal is a reversal in the order of the second symbol sequence. The method may further comprise the step of obtaining a complex conjugate of the reordered second symbol sequence. The method may further comprise the step of negating odd numbered symbols of the complex conjugated reordered second symbol sequence.

Preferably, the method further comprises the step of reversing the order of the even and odd numbered symbols of the complex conjugate second symbol sequence to form the second signal. The method may further comprise the step of encoding the first and second signals using Alamouti coding prior to the respective transmissions.

In an even further variation to the training scheme, the information signal may include a first training signal and a second training signal, the second training signal being a negation of the first training signal. The method may comprise the steps of transmitting the first training signal over a first symbol interval and transmitting the second training signal over a second symbol interval, the second symbol interval occurring after the first symbol interval. The method may further comprise the step of, at the destination station, negating the first and second signals to obtain channel estimates for the wireless communication relay channel. The method may further comprise the step of, at the destination station, calculating a mean of the first and second signals to obtain channel estimates for the wireless communication relay channel.

For both expressions and the variations, the information symbol may be modulated using OFDM. As an alternative, the information symbol may be modulated using Single Carrier-Cyclic Prefix.

Preferably, the first and second signals are coded using a coding matrix based on the number of antennas at the relay station. The method may further comprise the step of performing linear processing at the destination station.

The first and second antennas may be located at the same relay station, or at different relay stations.

The first noise element or the second noise element may include additive noise of the communication relay channel.

Preferably, the information signal from the source further comprises a cyclic prefix, and the method further comprises the step of removing part of the cyclic prefix at the relay station; and transmitting the remaining part of the cyclic prefix with the first signal or the second signal to the destination.

As an alternative, instead of removing part of the cyclic prefix, the method may further comprises the steps of:
removing the cyclic prefix at the relay station;
generating a second cyclic prefix at the relay station; and
appending the second cyclic prefix to the first signal or the second signal for transmission to the destination.

The first symbol sequence may further comprise a further information signal transmitted from a further source station destined for a further destination station. The second symbol sequence may further comprise a further information signal transmitted from a further source station destined for a further destination station.

The information signal may comprise a first header and the concurrent information signal may comprise a second header, the cross-correlation value obtained by correlating the first header and the second header with no offset is equal to the cross-correlation value obtained by correlating the first and the second header with offset greater than zero.

In a third specific expression of the invention, there is provided a header for a frame structure, the header comprising a sequence of symbols having a correlation value obtained by correlating the header with a copy of itself, the correlation value being a first value when there is no offset between the header and the copy of itself, and the correlation value is a second value when the offset between the header and the copy of itself is greater than zero.

Preferably, the first value is equal to the number of symbols in the sequence and the second value is zero. Sequence may be of CAZAC type or Frank-Zadoff type. The sequence may be of Maximum length sequence type.

Preferably, the first value is equal to the number of symbols in the sequence and the second value is −1.

In a fourth specific expression of the invention, there is provided a method of deriving a complex conjugate for a symbol sequence comprising the steps of:
(i) reversing the order of the symbol sequence;
(ii) performing a complex conjugation on the reversed symbol sequence.

The present invention also relates to apparatus or device for performing any of the above discussed methods or those which are described in the preferred embodiment(s). For example, certain features may be implemented on a integrated circuit used at a relay station. Specifically, in a fifth specific expression of the invention, there is provided apparatus for performing analog space-time relay of an information signal transmitted from a source station to a destination station over a wireless communication relay channel, the apparatus comprising:
i) a first relay antenna configured to receive a first symbol sequence which includes the information signal and a first noise element; and
(ii) a second relay antenna configured to receive a second symbol sequence which includes the information signal and a second noise element;
wherein, the first antenna is configured to transmit a first signal which is associated with the second symbol sequence received at the second relay antenna; and wherein
the second antenna is configured to transmit a second signal which is associated with the first symbol sequence received at the first relay antenna.

In a sixth specific expression of the invention, there is provided apparatus for performing analog space-time relay of an information signal transmitted from a source station to a destination station over a wireless communication relay channel, the apparatus comprising:
(i) a first relay antenna configured to receive a first symbol sequence and to retransmit the first symbol sequence as a first signal, the first symbol sequence comprising the information signal and a first noise element;
(ii) a second relay antenna configured to receive a second symbol sequence which includes the information signal and a second noise element; the second relay antenna further configured to transmit a second signal which is a reordering of the second symbol sequence.

In either or both the fifth and sixth specific expressions, the apparatus may be in the form of a relay station and the first and second antennas may be co-located at the relay station. In the alternative, the apparatus may include two relay stations and the first and second antennas may be located at separate relay stations.

In an seventh specific expression of the invention, there is provided an apparatus for deriving a complex conjugate for a symbol sequence, the apparatus comprising:
(i) a reverser for reversing the order of the symbol sequence;
(ii) a processor for performing a complex conjugation on the reversed symbol sequence.

The information signal from the source may comprise a cyclic prefix and the apparatus may further comprise:
a processing unit for removing part of the cyclic prefix at the relay station; and
a transmitter for transmitting the remaining part of the cyclic prefix and the message to the destination.

In the alternative, the apparatus may comprise:
a processing unit configured to remove the cyclic prefix, generate a second cyclic prefix, append the second cyclic prefix to the message; and transmit the message with the appended second cyclic prefix to the destination.

It can be appreciated from the described embodiment(s), that the method and apparatuses:
requires little signal processing at the relay (as opposed to digital processing means)
significantly lower implementation costs and power consumption
only requires linear processing to achieve maximum likelihood decoding
the flexibility of deploying either multiple antennas at the relay nodes, or multiple single-antenna relays.
If OFDM is used, it offers the following advantages:
achieves complete mitigation of ISI in the relay channels
only analog domain processing required at the relay
only linear decoding required at the destination

BRIEF DESCRIPTION OF THE DRAWINGS

By way of example only, one or more embodiments will be described with reference to the accompanying drawings, in which.

DETAILED DESCRIPTION OF THE PREFERRED EMBODIMENTS

Figure 1:
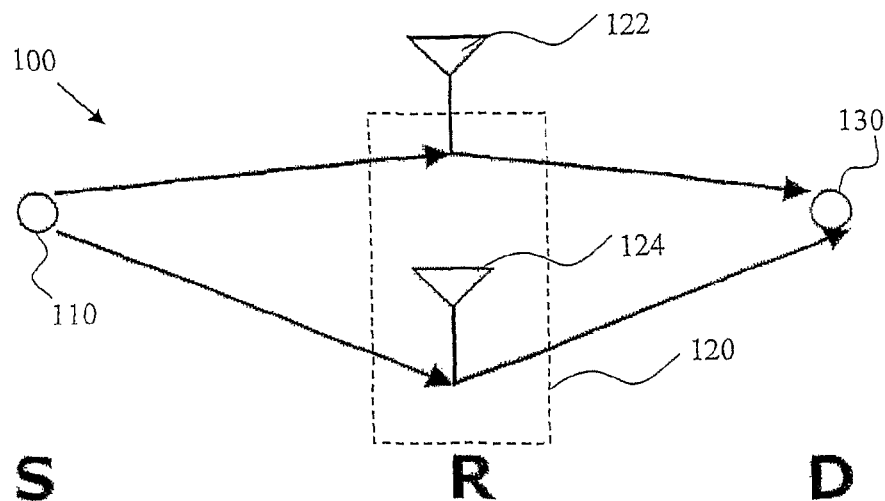
FIG. 1 is a schematic drawing of a communication channel having a source station S, relay station R and destination station D, according to an example embodiment.

FIG. 1 shows a communication channel according to an example embodiment. This channel consists of a source station/node 110 (S), a relay station 120 (R) and a destination station/node 130 (D). The source and the destination each have only one antenna, and the relay has two antennae 122, 124. Only one relay node will be used for communication and the proposed analog space-time coded (ASTC) relaying schemes is then be carried out on the selected relay in a straightforward manner. The ASTC relaying schemes in this embodiment is applied to orthogonal frequency division multiplexing (OFDM), in which the ASTC encoding is applied to individual subcarriers over two consecutive OFDM symbols.

Alternative embodiments may also apply the ASTC relaying schemes to single-carrier cyclic prefix (SC-CP) systems where the ASTC encoding is also applied to individual symbols over two consecutive SC-CP blocks.

Figure 2:
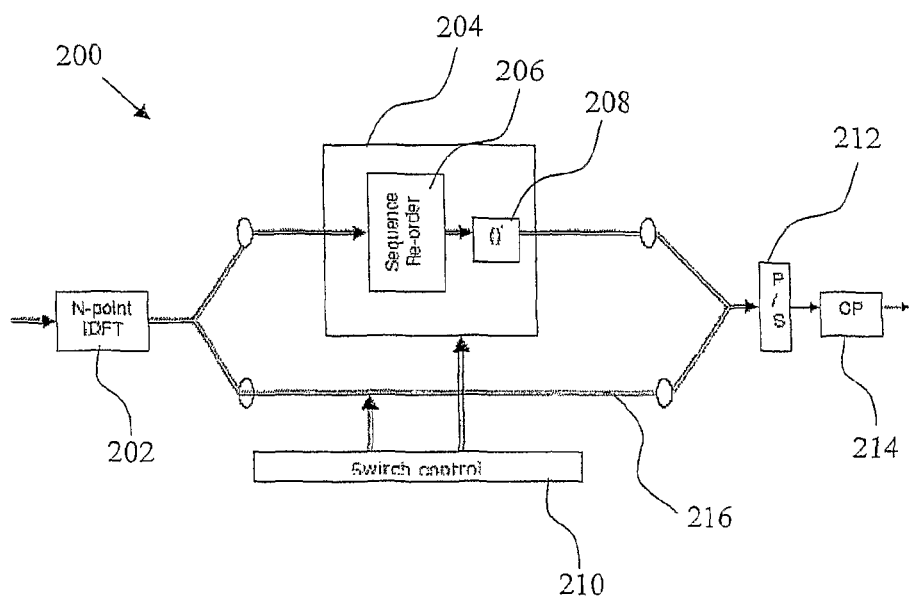
FIG. 2 is a schematic drawing of a transmitter for the source station of FIG. 1.

Alternative embodiments may also have more than two antennae at the relay station. FIG. 2 shows an example transmitter for the source according to the example embodiment. When OFDM is used as the modulation technique, OFDM symbols consisting of N words each enter the module 202 where an N-point inverse discrete Fourier transform (IDFT) converts the frequency domain signals to the time domain.

Alternative embodiments of FIG. 2 can use SC-CP as the modulation technique, in which case the module 202 is not necessary and symbols arriving at the module 202 can pass through unchanged.

During a first symbol intervals $t_{S,1}$ a first symbol denoted $x_1$ leaves the IDFT module 202 and the switch control 210 directs $x_1$ down the path 216. The symbol $x_1$ arrives at the parallel-to-serial converter 212 and then to a module 214 where cyclic prefix insertion is performed. The symbol $x_1$ with the cyclic prefix inserted is then transmitted using the antenna of the source.

During a second symbol intervals $t_{S,2}$, a second symbol denoted $x_2$ then leaves the IDFT module 202 and the switch control 210 directs $x_2$ to the processing unit 204 where signal conjugation is performed by the sequence re-ordering unit 206, the resultant then negated and conjugated by the conjugation unit 208. The conjugated symbol $x_2^*$ arrives at the parallel-to-serial converter 212 and then to a module 214 where cyclic prefix insertion is performed. The symbol $x_2$ with the cyclic prefix inserted is then transmitted using the antenna of the source.

Alternative embodiments can have a switch control 210 which operates by directing odd symbols down the path 216 while even symbols are directed to the processing unit 204.

Figure 3:
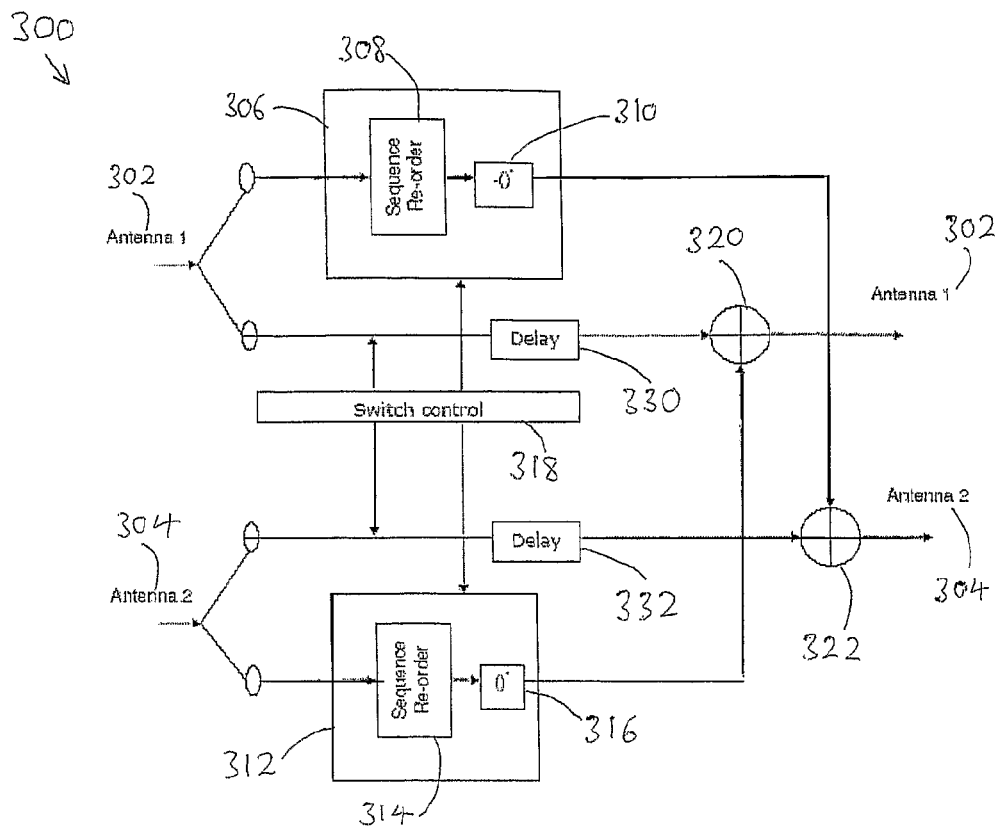
FIG. 3 is a schematic drawing of a receiver for the relay station of FIG. 1.

FIG. 3 shows a receiver 300 for the relay station D of FIG. 1. It can be implemented either with the radio frequency (RF) circuit, or after the analog-to-digital converter (ADC). In the latter case, the signals are still clocked at the high sampling frequency.

The symbol sequence (i.e. $x_1$ and $x_2^*$) transmitted from the source is received at the antennae of the relay station over two consecutive symbol intervals $t_{R,1}$ and $t_{R,2}$.

During $t_{R,1}$, the signals $r_{R,11}$ and $r_{R,21}$ are respectively received at the first antenna 302 and the second antenna 304. Signal $r_{R,11}$ is sent to the first delay unit 330 where the signal $r_{R,11}$ is delayed for a time period of $t_D$, where $t_D$ is the duration of one OFDM symbol. Signal $r_{R,21}$ is sent to the second delay unit 332 where the signal $r_{R,21}$ is delayed for a time period of $t_D$.

During $t_{R,2}$, the signals $r_{R,12}$ and $r_{R,22}$ are respectively received at the first antenna 302 and the second antenna 304. Signal $r_{R,12}$ is sent to the first processing unit 306 where signal conjugation is performed by the sequence re-ordering unit 308, the resultant then negated and conjugated by the conjugation unit 310. The resultant signal is $-r_{R,12}^*$. Signal $r_{R,22}$ is sent to the second processing unit 312 where signal conjugation is performed by the sequence re-ordering unit 314, the resultant then conjugated by the conjugation unit 316. The resultant signal is $r_{R,22}^*$.

A time period of $t_D$ is taken for the first processing unit 306 and the second processing unit 312 to respectively produce signals $-r_{R,12}^*$ and $r_{R,22}^*$. After $t_D$, the delayed signal of $r_{R,11}$ and the signal $r_{R,22}^*$ is sent to the first combiner unit 320. An addition operation is performed to combine $r_{R,11}$ and $r_{R,22}^*$ to produce $u_1$, i.e. $u_1 = r_{R,11} + r_{R,22}^*$.

The delayed signal of $r_{R,21}$ and the signal $-r_{R,12}^*$ is also sent to the second combiner unit 322 after T_D. An addition operation is performed at the combiner unit 332 to combine $r_{R,21}$ and $-r_{R,12}^*$ to produce $u_2$, i.e. $u_2 = r_{R,21} - r_{R,12}^*$.

The signals $u_1$ and $u_2$ can then be rearranged for re-transmission from the relay station in the form of $$Y = \begin{bmatrix} y_{11} & y_{12} \\ y_{21} & y_{22} \end{bmatrix} = \begin{bmatrix} u_1 & u_2^* \\ u_2 & -u_1^* \end{bmatrix}$$

Y in this case is Alamouti coded and the symbols $y_{11}$ and $y_{12}$ are transmitted from the first antenna 302 of the relay respectively over two consecutive symbol intervals $t_{R,3}$ and $t_{R,4}$. The symbols $y_{21}$ and $y_{22}$ are transmitted from the second antenna 304 of the relay respectively over two consecutive symbol intervals $t_{R,3}$ and $t_{R,4}$.

Figure 4A:
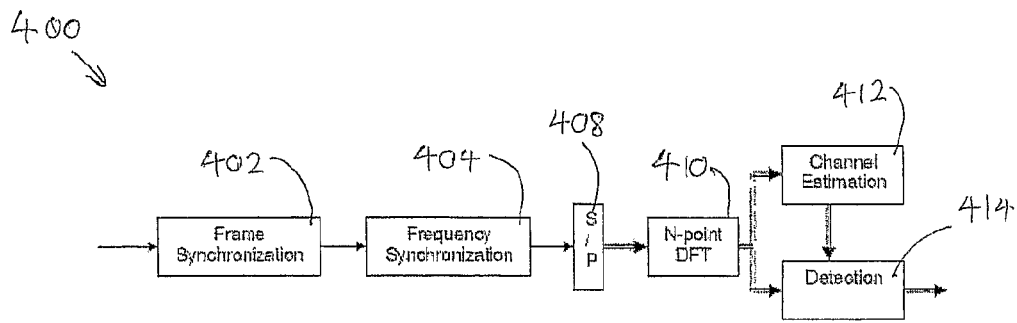
FIG. 4(a) is a schematic drawing of a receiver for a destination station of FIG. 1 where sequence reordering is not required.

FIG. 4(a) shows a receiver 400 for the destination station D. The received signals are converted to the digital domain and then packet detection, frame synchronization 402 and frequency synchronization 404 is done. Serial-to-parallel conversion 408 is done to convert each group of N serial symbols into an N-point vector. An N-point DFT is then done in 410 on the N-point vector, converting the N time domain symbols into N frequency components. Channel estimation 412 is then performed with the aid of the header sequence and training sequence while the detection unit 414 performs the signal detection using linear maximum likelihood detection on a per-subcarrier basis.

Alternative embodiments of FIG. 4(a) can use SC-CP as the modulation technique, in which case an inverse discrete Fourier transform (IDFT) can be performed after signal detection is done in the detection unit 414.

Figure 4B:
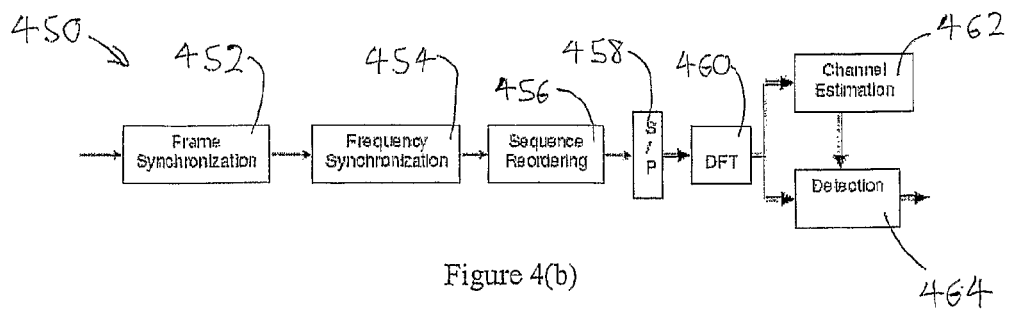
FIG. 4(b) is a schematic drawing of a variation of the receiver of FIG. 4(a) in which sequence reordering is required.

FIG. 4(b) shows an alternative receiver 450 for the destination. The received signals are converted to the digital domain and packet detection, frame synchronization 452 and frequency synchronization 454 are performed with the aid of the header sequence and training sequence. A sequence reordering unit 456 then performs a left-shift on those symbols that were reordered earlier at the transmitter. A serial-to-parallel conversion 458 is next done to convert each group of N serial symbols into an N-point vector. An N-point DFT is then done in 460 on the N-point vector, converting the N time domain symbols into N frequency components. Channel estimation 462 is then performed and signal detection is performed at the detection unit 464 using linear maximum likelihood detection on a per-subcarrier basis.

Alternative embodiments of FIG. 4(b) can use SC-CP as the modulation technique, in which case an inverse discrete Fourier transform (IDFT) can be performed after signal detection is done in the detection unit 464.

Frame Structure

Figure 7A:
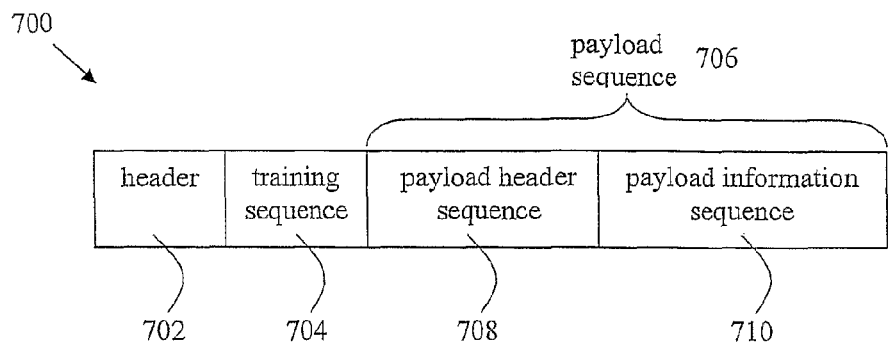
FIG. 7(a) is a schematic drawing of a frame structure according to the example embodiment.

FIG. 7(a) shows a frame structure 700 according to the example embodiment. The frame structure comprises a header 702, a training sequence 704 and a payload sequence 706.

The header 702 is a unique word sequence which is to be used for packet detection and frame synchronization. This unique word sequence will possess the following properties:
  A constant amplitude;
  A good auto-correlation property. If the header sequence w(n) has $N_w$ samples, i.e., n=1, ..., $N_W$, ideally, it should have the following property:

$$\sum_{n=1}^{N_W} w(n)w^*(n \oplus k) = \begin{cases} N_w, & k = 0 \\ 0, & \text{otherwise} \end{cases}$$

The above represents an autocorrelation operation, in which the $N_w$ sample long header sequence (i.e. w(n) for n=1,...,$N_W$) is correlated with its conjugated and cyclic-shifted version (i.e. w*(n) for n=1, ..., $N_W$). k represents the sample offset between the header sequence and its conjugated and cyclic-shifted version, and when k=0, there is no offset. w(n) represents the n-th symbol in the header sequence, where n=1, ..., $N_W$. When (n+k)=$N_w$, w(n⊕k) represents the (n+k)-th symbol in the header sequence and when (n+k)>$N_w$, w(n⊕k) represents the (n+k–$N_w$)-th symbol in the header sequence.

The header sequence can be chosen to be the CAZAC sequence or the Frank-Zadoff sequence.

Another choice for the header sequence is the maximum length sequence which has constant amplitude and the following auto-correlation property:

$$\sum_{n=1}^{N_W} w(n)w^*(n \oplus k) = \begin{cases} N_w, & k = 0 \\ -1, & \text{otherwise} \end{cases}$$

Following the header sequence 702 is the training sequence 704. The training sequence 704 is used in channel training and estimation, as will be elaborated later.

The payload sequence 706 may be sub-divided into a payload header sequence 708 and a payload information sequence 710, in which case the payload header sequence 708 follows the training sequence 704 and the payload information sequence 710 follows the payload header sequence 708. The payload header sequence 708 contains information needed to decode the payload information 710. The payload header 708 may also include the error control coding scheme, coding rate, modulation scheme, payload information length, etc.

It is also preferred that the frame structure 700 enables robust packet detection, robust frame boundary synchronization, robust training for channel estimation and robust decoding at the destination. Further, it is advantageous for the frame structure 700 to enable packet detection, frame boundary synchronization, training for channel estimation and decoding at the destination to be implemented in digital domain.

The frame structure 700 also enables the passing of essential payload information for packet demodulation and decoding. The frame structure 700 may have the advantage that as the training sequence 704 precedes the payload sequence 706, ASTC transmission with channel parameters estimated by the training sequence 704 can be applied to the payload sequence 706 in order to improve the transmission reliability.

Figure 7B:
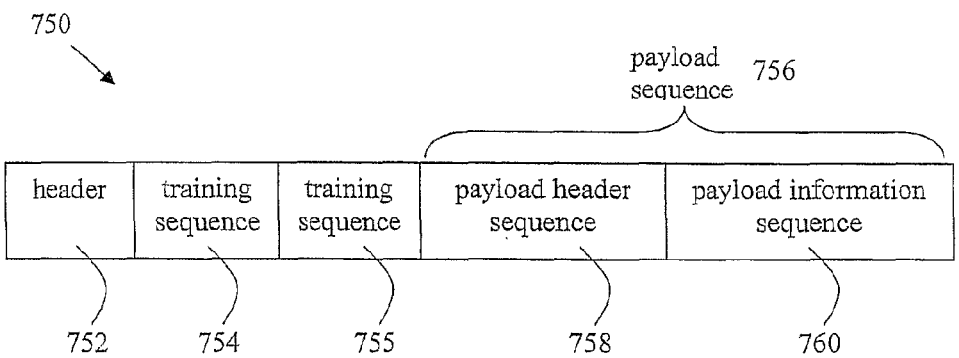
FIG. 7(b) is a variation of the frame structure of FIG. 7(a) in which there are two or more training sequences.

FIG. 7(b) shows an alternative embodiment with a modified frame structure 750 with two or more training sequences 754, 755. This embodiment may have the advantage of simplifying the frequency synchronization process at the destination. The two or more training sequences 754, 755 results in a frame structure 750 with a periodic training sequence. This permits the frequency error to be more easily estimated at the relay station and destination.

Transmission of a Frame

Figure 8:
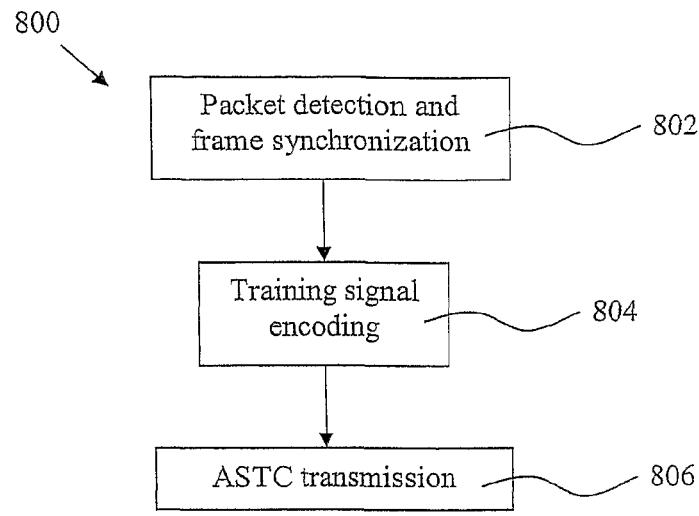
FIG. 8 is a flow diagram of a method of implementing ASTC transmission using the frame structure of FIG. 7(a)

FIG. 8 shows a method of implementing ASTC transmission at the relay station 120 using the frame structure 700 according to the example embodiment.

In 802, packet detection and frame synchronization is performed to detect the arrival of a packet at the relay station 120, and to identify the symbol timing in the packet. Frequency offset compensation may follow after symbol timing synchronization is achieved. Packet detection and frame synchronization 802 may be implemented using the header information 702 transmitted in the frame structure 700 and the relay station 120 receives the header 702 at both the first and second antennae 122, 124.

Packet detection and frame synchronization at the relay station 120 may be performed using a matched filter implemented in the analog domain. As the header 702 of the frame structure 700 has a good autocorrelation property, an obvious peak (or trough) at the output of the matched filter can be used to indicate a valid packet as well as the starting reference symbol of the packet.

Thereafter in 804, the relay station 120 performs training signal encoding using the training signal 704 that is received from the source 110. The purpose of training signal encoding 804 is to enable the destination 130 to estimate the channel state information (CSI) parameters. These CSI parameters will then be used when decoding transmissions during the ASTC transmissions step 806.

Following the training signal encoding 804, ASTC transmission 806 can then be performed to encode the received payload sequence 706 and transmit it over the communication channel. The steps of channel training signal encoding 804 and ASTC transmission 806 may be implemented using any of Coding Schemes 1 to 6.

Coding Scheme 1

Channel Training and Estimation Using Coding Scheme 1

Figure 6:
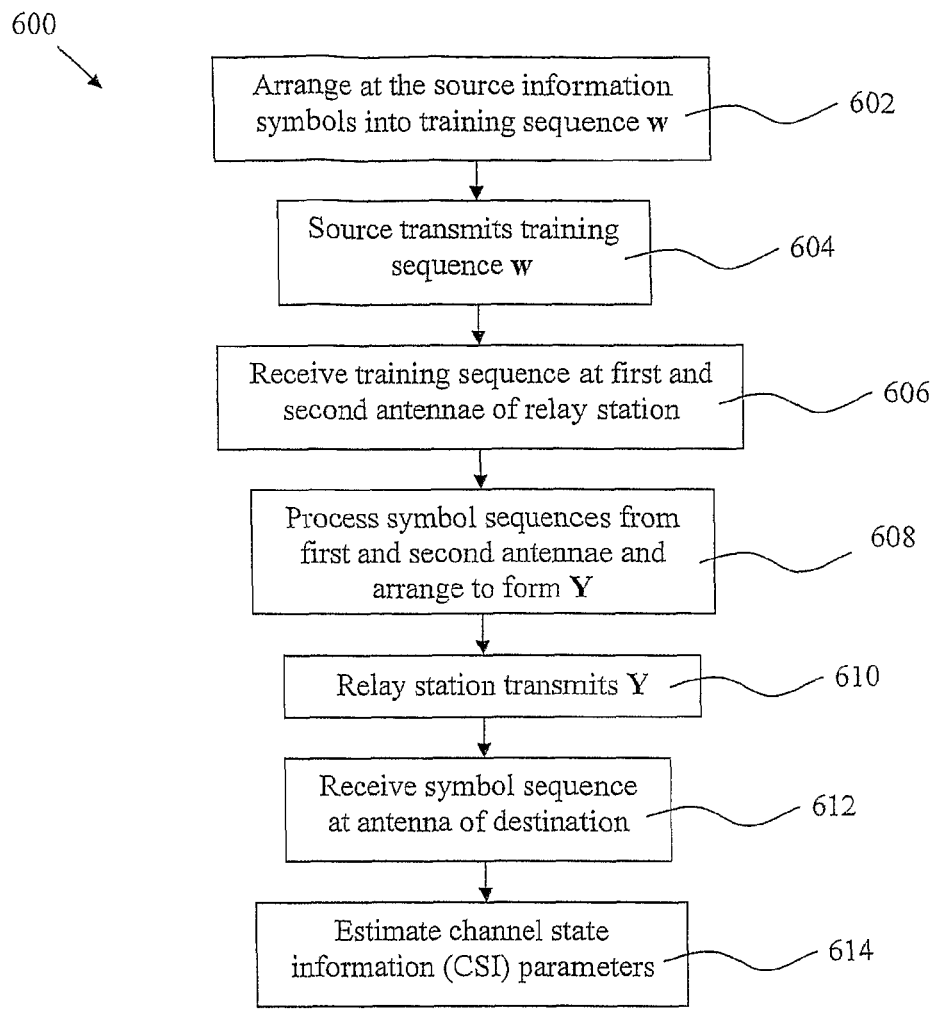
FIG. 6 is a flow diagram of a channel training and estimation method used in the flow diagram of FIG. 5.

FIG. 6 shows a method of channel training and estimation according to the example embodiment. This permits the estimation of the channel state information (CSI) parameters $h_{P,1}$, $h_{P,2}$ that are required for decoding at the destination. The CSI parameters are obtained using a training structure and channel estimation protocol that requires only analog processing at the relay station.

In 602, an information symbol represented by x is arranged for transmission from the source. x is chosen to have a symbol value of 1. A symbol sequence w representing the training sequence is formed where $$w=[x]$$

In 604, the source to relay link is activated. The source transmits the symbol sequence w over a symbol interval $t_{S,T,1}$. This transmission is done using the single antenna present at the source.

In 606, the symbol sequence transmitted from the source is received at the two antennae of the relay station in the symbol intervals $t_{R,T,1}$. At the first antenna, the symbol sequence consisting of the signal $r_{1,R,T}$ is received. At the second antenna, the symbol sequence consisting of the signal $r_{2,R,T}$ is received.

$$r_{1,R,T}=h_{1,S}+n_{1,T}$$

$$r_{2,R,T}=h_{2,S}+n_{2,T}$$

$h_{1,S}$ is the channel coefficient between the source node and the first antenna at the relay node, while $h_{2,S}$ is the channel coefficient between the source node and the second antenna at the relay node. $n_{1,T}$ represents the additive noise present at the first antenna. $n_{2,T}$ represents the additive noise present at the second antenna.

In 608, the symbol sequences $r_{1,R,T}$ from the first antenna and $r_{2,R,T}$ from the second antenna can then be arranged for transmission from the relay as Y. Y can preferably be Alamouti coded as $$Y = \begin{bmatrix} y_{11} & y_{12} \\ y_{21} & y_{22} \end{bmatrix} = \begin{bmatrix} r_{1,R,T} & r^*_{2,R,T} \\ r_{2,F,T} & -r^*_{1,R,T} \end{bmatrix}$$

In 610, the symbols $y_{11}$ and $y_{12}$ are transmitted from the first antenna of the relay respectively over two consecutive symbol intervals $t_{R,T,2}$ and $t_{R,T,3}$. The symbols $y_{21}$ and $y_{22}$ are transmitted from the second antenna of the relay respectively over two consecutive symbol intervals $t_{R,T,1}$ and $t_{R,T,3}$.

In 612, the symbol sequence transmitted from the relay is received at the antenna of the destination over two consecutive symbol intervals $t_{D,T,1}$ and $t_{D,T,2}$. At the destination, the symbol sequence consisting of signals $r_{D,T,1}$ and $r_{D,T,2}$ are respectively received during the intervals $t_{D,T,1}$ and $t_{D,T,2}$ and can be represented as $$\begin{bmatrix} r_{D,T,1} \\ r_{D,T,2} \end{bmatrix} = \begin{bmatrix} h_{D,1} r_{1,R,T}^* + h_{D,2} r_{2,R,T} + v_{1,D} \\ h_{D,1} r_{2,R,T}^* - h_{D,2} r_{1,R,T}^* + v_{2,D} \end{bmatrix}$$

$h_{D,1}$ is the channel coefficient between the first antenna of the relay station and the destination, while $h_{D,2}$ is the channel coefficient between the second antenna of the relay station and the destination. $v_{1,D}$ and $v_{2,D}$ respectively represent the additive noise at the destination present in the signals $r_{D,T,1}$ and $r_{D,T,2}$.

In 614, the channel state information (CSI) parameters $h_{P,1}$, $h_{P,2}$, characterizing the product channel are thus be estimated from $r_{D,T,1}$ and $r_{D,T,2}$.

$$\begin{bmatrix} r_{D,T,1} \\ r_{D,T,2} \end{bmatrix} = \begin{bmatrix} h_{D,1} h_{1,S} + h_{D,2} h_{2,S} + (h_{D,1} n_{1,T} + h_{D,2} n_{2,T} + v_{1,D}) \\ h_{D,1} h_{2,S}^* - h_{D,2} h_{1,S}^* + (h_{D,1} n_{2,T}^* + h_{D,2} n_{1,T}^* + v_{2,D}) \end{bmatrix}$$
$$= \begin{bmatrix} h_{P,1} + \tilde{v}_{1,D} \\ h_{P,2} + \tilde{v}_{2,D} \end{bmatrix}$$

Alternative embodiments can also use in 602 an information symbol value of $x=-1$, in which case the values of $r_{D,T,1}$ and $r_{D,T,2}$ should be negated. Alternative embodiments may also repeat the channel training and estimation of 602 to 614 multiple times. In this case, the channel state information (CSI) parameters $h_{P,1}$, $h_{P,2}$, may be taken to be the mean of the multiple channel state information (CSI) parameters estimated.

ASTC Transmission using Coding Scheme 1

Figure 5:
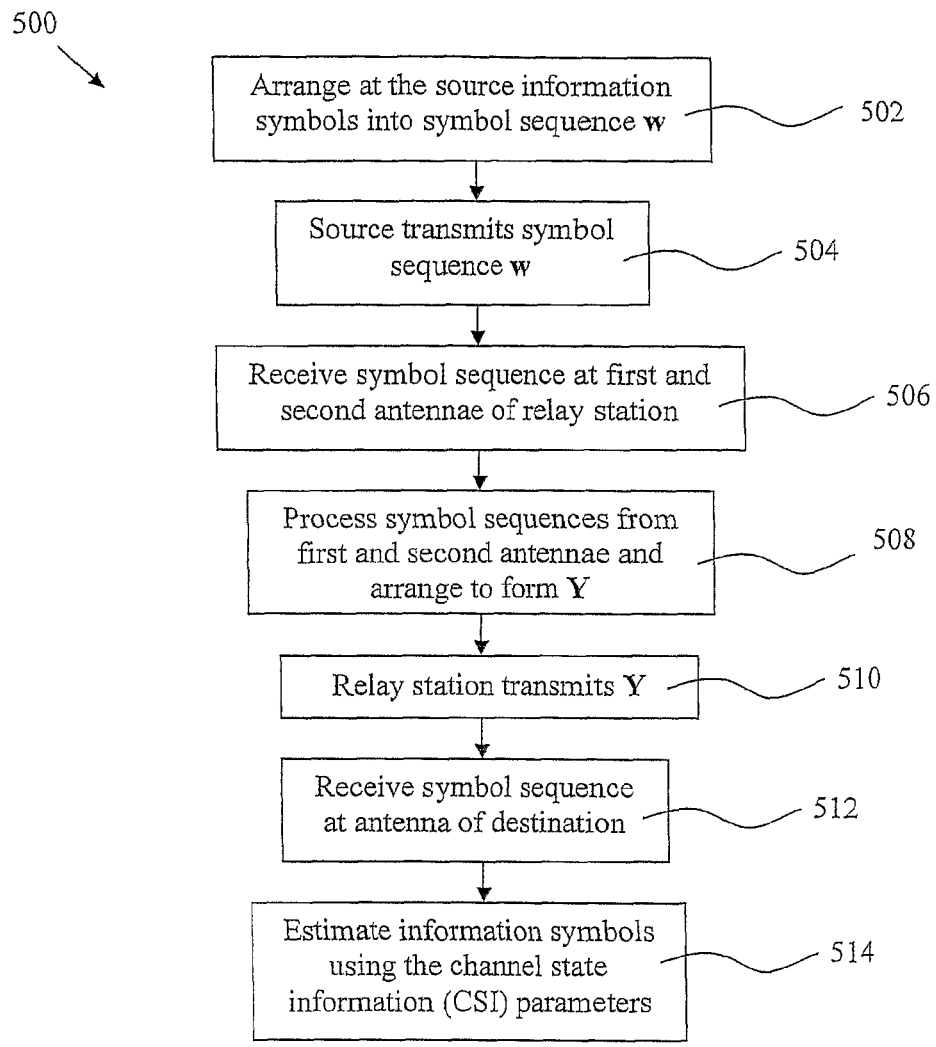
FIG. 5 is a flow diagram of a general ASTC transmission method over the communication channel of FIG. 1.

FIG. 5 is a flowchart which provides an overview of the ASTC transmission.

In 502, two information symbols represented by $x_1$ and $x_2$ are arranged for transmission from the source. $x_1$ and $x_2$ may be from the payload sequence 706 of the frame structure 700. The complex conjugate of $x_2$ is obtained as $x_2^*$. $x_1$ and $x_2^*$ are then arranged to form the symbol sequence w.

$$w = [x_1 \; x_2^*]$$

In 504, the source to relay link is activated. The source transmits over two consecutive symbol intervals $t_{S,1}$ and $t_{S,2}$, the symbol sequence w. The symbols $x_1$ is transmitted in $t_{S,1}$ and $x_2^*$ is transmitted in $t_{S,2}$. This transmission is done using an antenna present at the source.

In 506, the symbol sequence transmitted from the source is received at the two antennae of the relay station over two consecutive symbol intervals $t_{R,1}$ and $t_{R,2}$. At the first antenna, the symbol sequence consisting of signals $r_{R,11}$ and $r_{R,12}$ are respectively received during the intervals $t_{R,1}$ and $t_{R,2}$. At the second antenna, the symbol sequence consisting of the signals $r_{R,21}$ and $r_{R,22}$ are respectively received during the intervals $t_{R,1}$ and $t_{R,2}$.

The signals received by the first and second antenna can be represented by a matrix $r_R$ where $$r_R = \begin{bmatrix} r_{R,11} & r_{R,12} \\ r_{R,21} & r_{R,22} \end{bmatrix}$$
$$= \begin{bmatrix} h_{1,S} \\ h_{2,S} \end{bmatrix} [x_1 \; x_2^*] + \begin{bmatrix} n_{11} & n_{12} \\ n_{21} & n_{22} \end{bmatrix}$$
$$= \begin{bmatrix} h_{1,S} x_1 + n_{11} & h_{1,S} x_2^* + n_{12} \\ h_{2,S} x_1 + n_{21} & h_{2,S} x_2^* + n_{22} \end{bmatrix}$$

$h_{1,S}$ is the channel coefficient between the source and the first antenna of the relay station while $h_{2,S}$ is the channel coefficient between the source and the second antenna of the relay station. $n_{ij}$ represents the additive noise present at the i-th antenna at the j-th time.

In 508, the relay obtains a symbol sequence U by processing $r_R$ in the analog domain, where $$U = \begin{bmatrix} u_1 \\ u_2 \end{bmatrix}$$
$$= \begin{bmatrix} h_{1,S} & h_{2,S}^* \\ h_{2,S} & -h_{1,S}^* \end{bmatrix} \begin{bmatrix} x_1 \\ x_2 \end{bmatrix} + \begin{bmatrix} n_{11} + n_{22}^* \\ n_{21} - n_{12}^* \end{bmatrix}$$

In the computation of u, a complex conjugate of $r_{R,22}$ is computed and represented as $r_{R,22}^*$. A negated complex conjugate of $r_{R,12}$ is also computed and represented as $r_{R,12}^*$. $r_{R,11}$ is then combined with $r_{R,22}^*$ to form $u_1$. $r_{R,21}$ is also combined with $r_{R,12}^*$ to form $u_2$ where $$u_1 = r_{R,11} + r_{R,22}^*$$
$$= h_{1,S} x_1 + h_{2,S}^* x_2 + (n_{11} + n_{22}^*)$$
$$u_2 = r_{R,21} - r_{R,12}^*$$
$$= h_{2,S} x_1 - h_{1,S}^* x_2 + (n_{21} - n_{12}^*)$$

The components of the symbol sequence u can then be arranged for transmission from the relay as Y. Y can preferably be Alamouti coded as $$Y = \begin{bmatrix} y_{11} & y_{12} \\ y_{21} & y_{22} \end{bmatrix} = \begin{bmatrix} u_1 & u_2^* \\ u_2 & -u_1^* \end{bmatrix}$$

In 510, the symbols $y_{11}$ and $y_{12}$ are transmitted from the first antenna of the relay respectively over two consecutive symbol intervals $t_{R,3}$ and $t_{R,4}$. The symbols $y_{21}$ and $y_{22}$ are transmitted from the second antenna of the relay respectively over two consecutive symbol intervals $t_{R,3}$ and $t_{R,4}$.

In 512, the symbol sequence transmitted from the relay is received at the antenna of the destination over two consecutive symbol intervals $t_{D,1}$ and $t_{D,2}$. At the destination, the symbol sequence consisting of signals $r_{D,1}$ and $r_{D,2}^*$ are respectively received during the intervals $t_{D,1}$ and $t_{D,2}$ and can be represented as $$\begin{bmatrix} r_{D,1} \\ r_{D,2}^* \end{bmatrix} = \begin{bmatrix} h_{D,1} & h_{D,2} \\ -h_{D,2}^* & h_{D,1}^* \end{bmatrix} \begin{bmatrix} u_1 \\ u_2 \end{bmatrix} + \begin{bmatrix} v_1 \\ v_2^* \end{bmatrix}$$
$$= \begin{bmatrix} h_{D,1} & h_{D,2} \\ -h_{D,2}^* & h_{D,1}^* \end{bmatrix} \left( \begin{bmatrix} h_{1,S} & h_{2,S}^* \\ h_{2,S} & -h_{1,S}^* \end{bmatrix} \begin{bmatrix} x_1 \\ x_2 \end{bmatrix} + \begin{bmatrix} n_{11} + n_{22}^* \\ n_{21} - n_{12}^* \end{bmatrix} \right) + \begin{bmatrix} v_1 \\ v_2^* \end{bmatrix}$$

-continued $$= \begin{bmatrix} h_{D,1} & h_{D,2} \\ -h_{D,2}^* & h_{D,1}^* \end{bmatrix} \begin{bmatrix} h_{1,S} & h_{2,S}^* \\ h_{2,S} & -h_{1,S}^* \end{bmatrix} \begin{bmatrix} x_1 \\ x_2 \end{bmatrix} +$$

$$\left( \begin{bmatrix} h_{D,1} & h_{D,2} \\ -h_{D,2}^* & h_{D,1}^* \end{bmatrix} \begin{bmatrix} n_{11} + n_{22}^* \\ n_{21} - n_{12}^* \end{bmatrix} + \begin{bmatrix} v_1 \\ v_2^* \end{bmatrix} \right)$$

$h_{D,1}$ is the channel coefficient between the first antenna of the relay station and the destination, while $h_{D,2}$ is the channel coefficient between the second antenna of the relay station and the destination. $v_1$ and $v_2$ respectively represent the additive noise at the destination present in the signals $r_{D,1}$ and $r_{D,2}^*$. $r_{D,2}^*$ denotes the conjugation of $r_{D,2}$.

In 514, a product channel matrix $H_P$ is defined $$H_P = \begin{bmatrix} h_{P,1} & h_{P,2} \\ -h_{P,2}^* & h_{P,1}^* \end{bmatrix}$$

$$= \begin{bmatrix} h_{D,1} & h_{D,2} \\ -h_{D,2}^* & h_{D,1}^* \end{bmatrix} \begin{bmatrix} h_{1,S} & h_{2,S}^* \\ h_{2,S} & -h_{1,S}^* \end{bmatrix}$$

$$= \begin{bmatrix} h_{D,1}h_{1,S} + h_{D,2}h_{2,S} & h_{D,1}h_{2,S}^* - h_{D,2}h_{1,S}^* \\ h_{D,1}^* h_{2,S} - h_{D,2}^* h_{1,S} & -h_{D,1}^* h_{1,S}^* - h_{D,2}^* h_{2,S}^* \end{bmatrix}$$

Estimates of the information symbols $\tilde{x}_1$ and $\tilde{x}_2$ can then be obtained using a linear operation as $$\begin{bmatrix} \tilde{x}_1 \\ \tilde{x}_2 \end{bmatrix} = H_P^H \begin{bmatrix} r_{D,1} \\ r_{D,2}^* \end{bmatrix}$$

$$= (|h_{P,1}|^2 + |h_{P,2}|^2) \begin{bmatrix} x_1 \\ x_2 \end{bmatrix} + \begin{bmatrix} \tilde{v}_1 \\ \tilde{v}_2 \end{bmatrix}$$

where $$|h_{P,1}|^2 + |h_{P,2}|^2 = (|h_{D,1}|^2 + |h_{D,2}|^2)(|h_{1,S}|^2 + |h_{2,S}|^2)$$

$$= |h_{D,1}h_{1,S}|^2 + |h_{D,2}h_{2,S}|^2 + |h_{D,1}h_{2,S}|^2 + |h_{D,2}h_{1,S}|^2$$

and $$\begin{bmatrix} \tilde{v}_1 \\ \tilde{v}_2 \end{bmatrix} = (|h_{D,1}|^2 + |h_{D,2}|^2) \begin{bmatrix} h_{1,S}^* & h_{2,S} \\ h_{2,S}^* & -h_{1,S} \end{bmatrix} \begin{bmatrix} n_{11} + n_{22}^* \\ n_{21} - n_{12}^* \end{bmatrix} + \begin{bmatrix} h_{D,1}^* & -h_{D,2} \\ h_{D,2}^* & h_{D,1} \end{bmatrix} \begin{bmatrix} v_1 \\ v_2^* \end{bmatrix}$$

$h_{P,1}$ and $h_{P,2}$ are the channel state information (CSI) parameters characterizing the product channel that were estimated during the channel training and estimation. $H_P^H$ represents the conjugate transpose of $H_P$.

Coding Scheme 2

An alternative coding scheme according to the example embodiment is described below using FIG. 6.

Channel Training and Estimation Using Coding Scheme 2

FIG. 6 shows a method of channel training and estimation according to the example embodiment. This permits the estimation of the channel state information (CSI) parameters $h_{P,1}$ and $h_{P,2}$ that are required for decoding at the destination. The CSI parameters are obtained using a training structure and channel estimation protocol that requires only analog processing at the relay station.

In 602, an information symbol represented by x is arranged for transmission from the source. x is chosen to have a symbol value of 1. A symbol sequence w representing the training sequence is formed where $w = [X]$ In 604, the source to relay link is activated. The source transmits the symbol sequence w over a symbol interval $t_{S,T,1}$. This transmission is done using the single antenna present at the source.

In 606, the symbol sequence transmitted from the source is received at the two antennae of the relay station in the symbol intervals $t_{R,T,1}$. At the first antenna, the symbol sequence consisting of the signal $r_{1,R,T}$ is received. At the second antenna, the symbol sequence consisting of the signal $r_{2,R,T}$ is received.

$r_{1,R,T} = h_{1,S} + n_{1,T}$ $r_{2,R,T} = h_{2,S} + n_{2,T}$ $h_{1,S}$ is the channel coefficient between the source node and the first antenna at the relay node, while $h_{2,S}$ is the channel coefficient between the source node and the second antenna at the relay node. $n_{1,T}$ represents the additive noise present at the first antenna. $n_{2,T}$ represents the additive noise present at the second antenna.

In 608, the symbol sequences $r_{1,R,T}$ from the first antenna and $r_{2,R,T}$ from the second antenna can then be arranged for transmission from the relay as Y where $$Y = \begin{bmatrix} y_{11} & y_{12} & y_{13} & y_{14} \\ y_{21} & y_{22} & y_{23} & y_{24} \end{bmatrix} = \begin{bmatrix} r_{1,R,T} & r_{2,R,T}^* & 0 & 0 \\ 0 & 0 & r_{2,R,T} & -r_{1,R,T}^* \end{bmatrix}$$

In 610, the symbols $y_{11}$, $y_{12}$, $y_{13}$ and $y_{14}$ are transmitted from the first antenna of the relay respectively over four consecutive symbol intervals $t_{R,T,2}$, $t_{R,T,3}$, $t_{R,T,4}$ and $t_{R,T,5}$. The symbols $y_{21}$, $y_{22}$, $y_{23}$ and $y_{24}$ are transmitted from the second antenna of the relay respectively over two consecutive symbol intervals $t_{R,T,2}$, $t_{R,T,3}$, $t_{R,T,4}$ and $t_{R,T,5}$.

In 612, the symbol sequence transmitted from the relay is received at the antenna of the destination over four consecutive symbol intervals $t_{D,T,1}$, $t_{D,T,2}$, $t_{D,T,3}$ and $t_{D,T,4}$. At the destination, the symbol sequence consisting of signals $r_{D,T,2}$, $r_{D,T,3}$ and $r_{D,T,4}$ are respectively received during the intervals $t_{D,T,1}$, $t_{D,T,2}$, $t_{D,T,3}$ and $t_{D,T,4}$ and can be represented as $r_{D,T,1} = h_{D,1}r_{1,R,T} + v_{1,D}$ $= \tilde{h}_{P,11}$ $r_{D,T,2}^* = h_{D,1}^* r_{2,R,T} + v_{2,D}^*$ $= \tilde{h}_{P,22}$ $r_{D,T,3} = h_{D,2}r_{2,R,T} + v_{3,D}$ $= \tilde{h}_{P,12}$ $r_{D,T,4}^* = -h_{D,2}^* r_{1,R,T} + v_{4,D}^*$ $= \tilde{h}_{P,21}$ $h_{D,1}$ is the channel coefficient between the first antenna of the relay station and the destination, while $h_{D,2}$ is the channel coefficient between the second antenna of the relay station and the destination. $v_{1,D}$, $v_{2,D}$, $v_{3,D}$ and $v_{4,D}$ respectively represent the additive noise that is present in the signals $r_{D,T,1}$, $r_{D,T,2}$, $r_{D,T,3}$ and $r_{D,T,4}$ at the destination.

In 614, the channel state information (CSI) parameter $H_P$ characterizing the product channel are thus estimated from $r_{D,T,1}$, $r_{D,T,2}$, $r_{D,T,3}$ and $r_{D,T,4}$.

$$\tilde{H}_P = \begin{bmatrix} \tilde{h}_{P,11} & \tilde{h}_{P,12} \\ \tilde{h}_{P,21} & \tilde{h}_{P,22} \end{bmatrix}$$

Alternative embodiments can also use in 602 an information symbol value of x=−1, in which case the values of $r_{D,T,1}$, $r_{D,T,2}$, $r_{D,T,3}$ and $r_{D,T,4}$ should be negated.

Alternative embodiments can also repeat the channel training and estimation of 602 to 614 multiple times. In this case, the channel state information (CSI) parameter $H_P$ can be taken to be the mean of the multiple channel state information (CSI) parameter estimated.

ASTC Transmission Using Coding Scheme 2

The ASTC transmission using this scheme will now be described with reference to FIG. 5 again.

In 502, two information symbols represented by $x_1$ and $x_2$ are arranged for transmission from the source. $x_1$ and $x_2$ may be from the payload sequence of the frame structure. $x_1$ and $x_2$ are arranged to form the symbol sequence w where.

$$w = [w_1 \quad w_2] = \begin{bmatrix} 1 & 1 \\ 1 & -1 \end{bmatrix} \begin{bmatrix} x_1 \\ x_2 \end{bmatrix}$$

i.e. $w_1 = x_1 + x_2$ $w_2 = x_1 - x_2$ $w_1$ is thus obtained from the addition of $x_1$ and $x_2$ while $w_2$ is obtained from the difference of $x_1$ and $x_2$.

In 504, the source to relay link is activated. The source transmits over two consecutive symbol intervals $t_{S,1}$ and $t_{S,2}$, the symbol sequence w. The symbols $w_1$ is transmitted in $t_{S,1}$ and $w_2$ is transmitted in $t_{S,2}$. This transmission is done using an antenna present at the source.

In 506, the symbol sequence transmitted from the source is received at the two antennae of the relay station over two consecutive symbol intervals $t_{R,1}$ and $t_{R,2}$. At the first antenna, the symbol sequence consisting of signals $r_{R,11}$ and $r_{R,12}$ are respectively received during the intervals $t_{R,1}$ and $t_{R,2}$. At the second antenna, the symbol sequence consisting of the signals $r_{R,21}$ and $r_{R,22}$ are respectively received during the intervals $t_{R,1}$ and $t_{R,2}$.

The signals received by the first and second antenna can be represented by a matrix $r_R$ where $$r_R = \begin{bmatrix} r_{R,11} & r_{R,12} \\ r_{R,21} & r_{R,22} \end{bmatrix}$$

$$= \begin{bmatrix} h_{1,S} \\ h_{2,S} \end{bmatrix} [w_1 \quad w_2] + \begin{bmatrix} n_{11} & n_{12} \\ n_{21} & n_{22} \end{bmatrix}$$

$$= \begin{bmatrix} h_{1,S}(x_1+x_2)+n_{11} & h_{1,S}(x_1-x_2)+n_{12} \\ h_{2,S}(x_1+x_2)+n_{21} & h_{2,S}(x_1-x_2)+n_{22} \end{bmatrix}$$

$h_{1,S}$ is the channel coefficient between the source and the first antenna of the relay station while $h_{2,S}$ is the channel coefficient between the source and the second antenna of the relay station. $n_{ij}$ represents the additive noise present at the i-th antenna at the j-th time.

In 508, the relay obtains a symbol sequence U by processing $r_R$ in the analog domain, where $$U = \begin{bmatrix} u_1 \\ u_2 \end{bmatrix} \text{ and }$$

-continued $u_1 = r_{R,11} + r_{R,12}$ $\quad = 2h_{1,S}x_1 + (n_{11} + n_{12})$ $u_2 = r_{R,21} + r_{R,22}$ $\quad = 2h_{2,S}x_2 + (n_{21} - n_{22})$ The components of the symbol sequence u can then be arranged for transmission from the relay as Y. Y can preferably be Alamouti coded as $$Y = \begin{bmatrix} y_{11} & y_{12} \\ y_{21} & y_{22} \end{bmatrix} = \begin{bmatrix} u_1 & u_2^* \\ u_2 & -u_1^* \end{bmatrix}$$

In 510, the symbols $y_{11}$ and $y_{12}$ are transmitted from the first antenna of the relay respectively over two consecutive symbol intervals $t_{R,3}$ and $t_{R,4}$. The symbols $y_{21}$ and $y_{22}$ are transmitted from the second antenna of the relay respectively over two consecutive symbol intervals $t_{R,3}$ and $t_{R,4}$.

In 512, the symbol sequence transmitted from the relay is received at the antenna of the destination over two consecutive symbol intervals $t_{D,1}$ and $t_{D,2}$. At the destination, the symbol sequence consisting of signals $r_{D,1}$ and $r_{D,2}^*$ are respectively received during the intervals $t_{D,1}$ and $t_{D,2}$ and can be represented as $$\begin{bmatrix} r_{D,1} \\ r_{D,2}^* \end{bmatrix} = \begin{bmatrix} h_{D,1} & h_{D,2} \\ -h_{D,2}^* & h_{D,1}^* \end{bmatrix} \begin{bmatrix} u_1 \\ u_2 \end{bmatrix} + \begin{bmatrix} v_1 \\ v_2^* \end{bmatrix}$$

$$= \begin{bmatrix} h_{D,1} & h_{D,2} \\ -h_{D,2}^* & h_{D,1}^* \end{bmatrix} \left( 2\begin{bmatrix} h_{1,S} & 0 \\ 0 & h_{2,S} \end{bmatrix} \begin{bmatrix} x_1 \\ x_2 \end{bmatrix} + \begin{bmatrix} n_{11}+n_{22}^* \\ n_{21}-n_{12}^* \end{bmatrix} \right) + \begin{bmatrix} v_1 \\ v_2^* \end{bmatrix}$$

$$= 2\begin{bmatrix} h_{D,1} & h_{D,2} \\ -h_{D,2}^* & h_{D,1}^* \end{bmatrix} \begin{bmatrix} h_{1,S} & 0 \\ 0 & h_{2,S} \end{bmatrix} \begin{bmatrix} x_1 \\ x_2 \end{bmatrix} +$$

$$\begin{bmatrix} h_{D,1}(n_{11}+n_{22}^*) + h_{D,2}(n_{21}-n_{12}^*) + v_1 \\ -h_{D,2}^*(n_{11}+n_{22}^*) + h_{D,1}^*(n_{21}-n_{12}^*) + v_2^* \end{bmatrix}$$

$h_{D,1}$ is the channel coefficient between the first antenna of the relay station and the destination, while $h_{D,2}$ is the channel coefficient between the second antenna of the relay station and the destination. $r_{D,2}^*$ denotes the conjugation of $r_{D,2}$. $v_1$ and $v_2$ respectively represent the additive noise present in the signals $r_{D,1}$ and $r_{D,2}$ at the destination.

In 514, estimates of the information symbols $\tilde{x}_1$ and $\tilde{x}_2$ can then be obtained using a linear operation as $$\begin{bmatrix} \tilde{x}_1 \\ \tilde{x}_2 \end{bmatrix} = H_P^H \begin{bmatrix} r_{D,1} \\ r_{D,2}^* \end{bmatrix}$$

$$= 2(|h_{D,1}|^2 + |h_{D,2}|^2) \begin{bmatrix} |h_{1,S}|^2 x_1 \\ |h_{2,S}|^2 x_2 \end{bmatrix} + \begin{bmatrix} \tilde{v}_1 \\ \tilde{v}_2 \end{bmatrix}$$

$H_P$ is the channel state information (CSI) parameter estimated during channel training and estimation that characterizes the product channel. The product channel matrix $H_P$ is $$H_P = \begin{bmatrix} \tilde{h}_{P,11} & \tilde{h}_{P,12} \\ \tilde{h}_{P,21} & \tilde{h}_{P,22} \end{bmatrix}$$

-continued $$= \begin{bmatrix} h_{D,1} & h_{D,2} \\ -h_{D,2}^* & h_{D,1}^* \end{bmatrix} \begin{bmatrix} h_{1,S} & 0 \\ 0 & h_{2,S} \end{bmatrix}$$

Coding Scheme 3

A second alternative coding scheme is described below referring to FIG. 6.

Channel Training and Estimation Using Coding Scheme 3

FIG. 6 shows a method of channel training and estimation according to the example embodiment. This permits the estimation of the channel state information (CSI) parameters $h_{P,1}$ and $h_{P,2}$ that are required for decoding at the destination. The CSI parameters are obtained using a training structure and channel estimation protocol that requires only analog processing at the relay station.

In 602, an information symbol represented by x is arranged for transmission from the source. x is chosen to have a symbol value of 1. A symbol sequence w representing the training sequence is formed where $$w=[x]$$

In 604, the source to relay link is activated. The source transmits the symbol sequence w over a symbol interval $t_{S,T,1}$. This transmission is done using the single antenna present at the source.

In 606, the symbol sequence transmitted from the source is received at the two antennae of the relay station in the symbol intervals $t_{R,T,1}$. At the first antenna, the symbol sequence consisting of the signal $r_{1,R,T}$ is received. At the second antenna, the symbol sequence consisting of the signal $r_{2,R,T}$ is received.

$$r_{1,R,T} = h_{1,S} + n_{1,T}$$

$$r_{2,R,T} = h_{2,S} + n_{2,T}$$

$h_{1,S}$ is the channel coefficient between the source and the first antenna of the relay station while $h_{2,S}$ is the channel coefficient between the source and the second antenna of the relay station. $n_{ij}$ represents the additive noise present at the i-th antenna at the j-th time.

In 608, the symbol sequences $r_{1,R,T}$ from the first antenna and $r_{2,R,T}$ from the second antenna can then be arranged for transmission from the relay as Y where $$Y = \begin{bmatrix} y_{11} & y_{12} & y_{13} & y_{14} \\ y_{21} & y_{22} & y_{23} & y_{24} \end{bmatrix} = \begin{bmatrix} r_{1,R,T} & r_{1,R,T} & -r_{2,R,T}^* & r_{2,R,T}^* \\ -r_{2,R,T} & r_{2,R,T} & -r_{1,R,T}^* & -r_{1,R,T}^* \end{bmatrix}$$

In 610, The symbols $y_{11}$, $y_{12}$, $y_{13}$ and $y_{14}$ are transmitted from the first antenna of the relay respectively over four consecutive symbol intervals $t_{R,T,2}$, $t_{R,T,3}$, $t_{R,T,4}$ and $t_{R,T,5}$. The symbols $y_{21}$, $y_{22}$, $y_{23}$ and $y_{24}$ are transmitted from the second antenna of the relay respectively over four consecutive symbol intervals $t_{R,T,2}$, $t_{R,T,3}$, $t_{R,T,4}$ and $t_{R,T,5}$.

The following operations have to be performed to obtain $y_{11}$, $y_{12}$, $y_{13}$ and $y_{14}$ and transmit it from the first antenna:
over the first and the second symbol intervals i.e. $t_{R,T,2}$ and $t_{R,T,3}$, the received signal at the first antenna i.e. $r_{1,R,T}$ is transmitted to the destination;
over the third symbol interval i.e. $t_{R,T,4}$, the negative conjugate of the received signal at the second antenna i.e. $-r_{2,R,T}^*$ is transmitted to the destination;
over the fourth symbol interval i.e. $t_{R,T,5}$, the conjugate of the received signal at the second antenna i.e. $r_{2,R,T}^*$ is transmitted to the destination.

The following operations have to be performed to obtain $y_{21}$, $y_{22}$, $y_{23}$ and $y_{24}$ and transmit it from the second antenna:
over the first symbol interval i.e. $t_{R,T,2}$ the negative received signal at the second antenna i.e. $-r_{2,R,T}$ is transmitted to the destination;
over the second symbol intervals i.e. $t_{R,T,3}$, the received signal at the second antenna i.e. $r_{2,R,T}$ is transmitted to the destination;
over the third and the fourth symbol intervals i.e. $t_{R,T,4}$ and $t_{R,T,5}$, the negative conjugate of the received signal at the first antenna i.e. $-r_{1,R,T}^*$ is transmitted to the destination;

In 612, the symbol sequence transmitted from the relay is received at the antenna of the destination over four consecutive symbol intervals $t_{D,T,1}$, $t_{D,T,2}$, $t_{D,T,3}$ and $t_{D,T,4}$. At the destination, the symbol sequence consisting of signals $r_{D,T,1}$, $r_{D,T,2}$, $r_{D,T,3}$ and $r_{D,T,4}$ are respectively received during the intervals $t_{D,T,1}$, $t_{D,T,2}$, $t_{D,T,3}$ and $t_{D,T,4}$.

In 614, the channel state information (CSI) parameter $H_P$ characterizing the product channel are thus estimated from $r_{D,T,1}$, $r_{D,T,2}$, $r_{D,T,3}$ and $r_{D,T,4}$ as $$[\tilde{h}_{P,11} \quad \tilde{h}_{P,12}] = [r_{D,T,1} \quad r_{D,T,2}] \begin{bmatrix} 1 & -1 \\ 1 & 1 \end{bmatrix}$$

$$[\tilde{h}_{P,22} \quad \tilde{h}_{P,21}] = [r_{D,T,3}^* \quad r_{D,T,4}^*] \begin{bmatrix} -1 & 1 \\ 1 & 1 \end{bmatrix} \text{ where}$$

$$H_P = \begin{bmatrix} \tilde{h}_{P,11} & \tilde{h}_{P,12} \\ \tilde{h}_{P,21} & \tilde{h}_{P,22} \end{bmatrix}$$

Alternative embodiments may also use in 602 an information symbol value of x=−1, in which case the values of $r_{D,T,1}$, $r_{D,T,2}$, $r_{D,T,3}$ and $r_{D,T,4}$ should be negated.

Alternative embodiments may also repeat the channel training and estimation of 602 to 614 multiple times. In this case, the channel state information (CSI) parameter $H_P$ may be taken to be the mean of the multiple channel state information (CSI) parameters estimated.

ASTC Transmission Using Coding Scheme 3

The ASTC transmission of information may be done in the same manner as that for Coding Scheme 2.

Coding Scheme 4

A third alternative coding scheme according to the example embodiment is described below using FIG. 6.

Channel Training and Estimation Using Coding Scheme 4

FIG. 6 shows a method of channel training and estimation according to the example embodiment. This permits the estimation of the channel state information (CSI) parameter $H_P$ that are required for decoding at the destination, where $$H_P = \begin{bmatrix} \tilde{h}_{P,11} & \tilde{h}_{P,12} \\ \tilde{h}_{P,21} & \tilde{h}_{P,22} \end{bmatrix} = (h_{1,S} + h_{2,S}) \begin{bmatrix} h_{D,1} & h_{D,2} \\ -h_{D,2}^* & h_{D,1}^* \end{bmatrix}$$

The CSI parameters are obtained using a training structure and channel estimation protocol that requires only analog processing at the relay station.

In 602, an information symbol represented by x is arranged for transmission from the source. x is chosen to have a symbol value of 1. A symbol sequence w representing the training sequence is formed where $$w=[x]$$

In 604, the source to relay link is activated. The source transmits the symbol sequence w over a symbol interval $t_{S,T,1}$. This transmission is done using the single antenna present at the source.

In 606 the symbol sequence transmitted from the source is received at the two antennae of the relay station in the symbol intervals $t_{R,T,1}$. At the first antenna, the symbol sequence consisting of the signal $r_{1,R,T}$ is received. At the second antenna, the symbol sequence consisting of the signal $r_{2,R,T}$ is received.

$$r_{1,R,T} = h_{1,S} + n_{1,T}$$

$$r_{2,R,T} = h_{2,S} + n_{2,T}$$

$h_{1,S}$ is the channel coefficient between the source and the first antenna of the relay station while $h_{2,S}$ is the channel coefficient between the source and the second antenna of the relay station. $n_{ij}$ represents the additive noise present at the i-th antenna at the j-th time.

In 608, the symbol sequences $r_{1,R,T}$ from the first antenna and $r_{2,R,T}$ from the second antenna can then be combined to form $u_T$ where $$u_T = r_{1,R,T} + r_{2,R,T}$$
$$= (h_{1,S} + h_{2,S}) + (n_{1,T} + n_{2,T})$$

$u_T$ is then arranged for transmission from the relay as Y where $$Y = \begin{bmatrix} y_{11} & y_{12} & y_{13} & y_{14} \\ y_{21} & y_{22} & y_{23} & y_{24} \end{bmatrix} = \begin{bmatrix} u_T & -u_T & u_T^* & u_T^* \\ -u_T^* & -u_T^* & u_T & -u_T \end{bmatrix}$$

In 610, the symbols $y_{11}$, $y_{12}$, $y_{13}$ and $y_{14}$ are transmitted from the first antenna of the relay respectively over four consecutive symbol intervals $t_{R,T,2}$, $t_{R,T,3}$, $t_{R,T,4}$ and $t_{R,T,5}$. The symbols $y_{21}$, $y_{22}$, $y_{23}$ and $y_{24}$ are transmitted from the second antenna of the relay respectively over two consecutive symbol intervals $t_{R,T,2}$, $t_{R,T,3}$, $t_{R,T,4}$ and $t_{R,T,5}$.

In 612, the symbol sequence transmitted from the relay is received at the antenna of the destination over four consecutive symbol intervals $t_{D,T,1}$, $t_{D,T,2}$, $t_{D,T,3}$ and $t_{D,T,4}$. At the destination, the symbol sequence consisting of signals $r_{D,T,1}$, $r_{D,T,2}$, $r_{D,T,3}$ and $r_{D,T,4}$ are respectively received during the intervals $t_{D,T,1}$, $t_{D,T,2}$, $t_{D,T,3}$ and $t_{D,T,4}$.

In 614, the channel state information (CSI) parameters $h_{P,1}1$, $h_{P,1}2$, $h_{P,1}1$ and $r_{P,1}2$ characterizing the product channel are thus estimated from $r_{D,T,1}$, $r_{D,T,2}$, $r_{D,T,3}$ and $r_{D,T,4}$.

$$\tilde{h}_{P,11} = \frac{1}{2}(r_{D,T,1} - r_{D,T,2})$$

$$\tilde{h}_{P,12} = \frac{1}{2}(r_{D,T,3} - r_{D,T,4})$$

$$\tilde{h}_{P,21} = \frac{1}{2}(r_{D,T,1} + r_{D,T,2})^*$$

$$\tilde{h}_{P,22} = \frac{1}{2}(r_{D,T,3} + r_{D,T,4})^*$$

Alternative embodiments can also use in 602 an information symbol value of x=−1, in which case the values of $r_{D,T,1}$ and $r_{D,T,2}$ should be negated.

Alternative embodiments can also repeat the channel training and estimation of 602 to 614 multiple times. In this case, the channel state information (CSI) parameter $H_P$ can be taken to be the mean of the multiple channel state information (CSI) parameters estimated.

ASTC Transmission Using Coding Scheme 4

The ASTC transmission using this scheme will now be described referring again to FIG. 5.

In 502, two information symbols represented by $x_1$ and $x_2$ are arranged for transmission from the source. $x_1$ and $x_2$ may be from the payload sequence of the frame structure. $x_1$ and $x_2$ are then arranged to form the symbol sequence w.

$$w = [x_1 \ x_2]$$

In 504, the source to relay link is activated. The source transmits over two consecutive symbol intervals $t_{S,1}$ and $t_{S,2}$, the symbol sequence w. The symbols $x_1$ is transmitted in $t_{S,1}$ and $x_2$ is transmitted in $t_{S,2}$. This transmission is done using an antenna present at the source.

In 506, the symbol sequence transmitted from the source is received at the two antennae of the relay station over two consecutive symbol intervals $t_{R,1}$ and $t_{R,2}$. At the first antenna, the symbol sequence consisting of signals $r_{R,11}$ and $r_{R,12}$ are respectively received during the intervals $t_{R,1}$ and $t_{R,2}$. At the second antenna, the symbol sequence consisting of the signals $r_{R,21}$ and $r_{R,22}$ are respectively received during the intervals $t_{R,1}$ and $t_{R,2}$.

The signals received by the first and second antenna can be represented by a matrix $r_R$ where $$r_R = \begin{bmatrix} r_{R,11} & r_{R,12} \\ r_{R,21} & r_{R,22} \end{bmatrix}$$
$$= \begin{bmatrix} h_{1,S} \\ h_{2,S} \end{bmatrix} [x_1 \ x_2] + \begin{bmatrix} n_{11} & n_{12} \\ n_{21} & n_{22} \end{bmatrix}$$
$$= \begin{bmatrix} h_{1,S}x_1 + n_{11} & h_{1,S}x_2 + n_{12} \\ h_{2,S}x_1 + n_{21} & h_{2,S}x_2 + n_{22} \end{bmatrix}$$

$h_{1,S}$ is the channel coefficient between the source and the first antenna of the relay station while $h_{2,S}$ is the channel coefficient between the source and the second antenna of the relay station. $n_{ij}$ represents the additive noise present at the i-th antenna at the j-th time.

In 508, the relay obtains a symbol sequence U by processing $r_R$ in the analog domain, where $$U = \begin{bmatrix} u_1 \\ u_2 \end{bmatrix} \text{ and}$$

$$u_1 = r_{R,11} + r_{R,21}$$
$$= (h_{1,S} + h_{2,S})x_1 + (n_{11} + n_{21})$$
$$u_2 = r_{R,12} + r_{R,22}$$
$$= (h_{1,S} + h_{2,S})x_2 + (n_{12} + n_{22})$$

The components of the symbol sequence u can then be arranged for transmission from the relay as Y. Y can preferably be Alamouti coded as $$Y = \begin{bmatrix} y_{11} & y_{12} \\ y_{21} & y_{22} \end{bmatrix} = \begin{bmatrix} u_1 & u_2^* \\ u_2 & -u_1^* \end{bmatrix}$$

In 510, the symbols $y_{11}$ and $y_{12}$ are transmitted from the first antenna of the relay respectively over two consecutive symbol intervals $t_{R,3}$ and $t_{R,4}$. The symbols $y_{21}$ and $y_{22}$ are transmitted from the second antenna of the relay respectively over two consecutive symbol intervals $t_{R,3}$ and $t_{R,4}$.

In 512, the symbol sequence transmitted from the relay is received at the antenna of the destination over two consecutive symbol intervals $t_{D,1}$ and $t_{D,2}$. At the destination, the symbol sequence consisting of signals $r_{D,1}$ and $r_{D,2}$ are respectively received during the intervals $t_{D,1}$ and $t_{D,2}$ and can be represented as $$\begin{bmatrix} r_{D,1} \\ r_{D,2}^* \end{bmatrix} = \begin{bmatrix} h_{D,1} & h_{D,2} \\ -h_{D,2}^* & h_{D,1}^* \end{bmatrix} \begin{bmatrix} u_1 \\ u_2 \end{bmatrix} + \begin{bmatrix} v_1 \\ v_2^* \end{bmatrix}$$

$$= \begin{bmatrix} h_{D,1} & h_{D,2} \\ -h_{D,2}^* & h_{D,1}^* \end{bmatrix} \left( (h_{1,S} + h_{2,S}) \begin{bmatrix} x_1 \\ x_2 \end{bmatrix} + \begin{bmatrix} n_{11} + n_{21} \\ n_{12} + n_{22} \end{bmatrix} \right) + \begin{bmatrix} v_1 \\ v_2^* \end{bmatrix}$$

$$= (h_{1,S} + h_{2,S}) \begin{bmatrix} h_{D,1} & h_{D,2} \\ -h_{D,2}^2 & h_{D,1}^* \end{bmatrix} \begin{bmatrix} x_1 \\ x_2 \end{bmatrix} +$$

$$\left( \begin{bmatrix} h_{D,1} & h_{D,2} \\ -h_{D,2}^2 & h_{D,1}^* \end{bmatrix} \begin{bmatrix} n_{11} + n_{21} \\ n_{12} + n_{22} \end{bmatrix} + \begin{bmatrix} v_1 \\ v_2^* \end{bmatrix} \right)$$

$h_{D,1}$ is the channel coefficient between the first antenna of the relay station and the destination, while $h_{D,2}$ is the channel coefficient between the second antenna of the relay station and the destination. $v_1$ and $v_2$ respectively represent the additive noise present in the signals $r_{D,1}$ and $r_{D,2}^*$ at the destination. $r_{D,2}^*$ denotes the conjugation of $r_{D,2}$.

In 514, estimates of the information symbols $\tilde{x}_1$ and $\tilde{x}_2$ can then be obtained using a linear operation as $$\begin{bmatrix} \tilde{x}_1 \\ \tilde{x}_2 \end{bmatrix} = (h_{1,S} + h_{2,S})^* \begin{bmatrix} h_{D,1}^* & -h_{D,2} \\ h_{D,2}^* & h_{D,1} \end{bmatrix} \begin{bmatrix} r_{D,1} \\ r_{D,2}^* \end{bmatrix}$$

$$= |h_{1,S} + h_{2,S}|^2 (|h_{D,1}|^2 + |h_{D,2}|^2) \begin{bmatrix} x_1 \\ x_2 \end{bmatrix} + \begin{bmatrix} \tilde{v}_1 \\ \tilde{v}_2 \end{bmatrix}$$

where $\tilde{v}_1 =$ $(h_{1,S} + h_{2,S})^* (|h_{D,1}|^2 + |h_{D,2}|^2)(n_{11} + n_{21}) + (h_{1,S} + h_{2,S})^* (h_{D,1} v_1 + h_{D,2} v_2^*)$ $\tilde{v}_2 = (h_{1,S} + h_{2,S})^* (|h_{D,1}|^2 + |h_{D,2}|^2)(n_{12} + n_{22}) +$ $(h_{1,S} + h_{2,S})^* (-h_{D,2}^* v_1 + h_{D,1}^* v_2^*)$ Coding Scheme 5

A fourth alternative coding scheme according to the example embodiment is described below using FIG. 6.

Channel Training and Estimation Using Coding Scheme 5

FIG. 6 shows a method of channel training and estimation according to the example embodiment. This permits the estimation of the channel state information (CSI) parameters that are required for decoding at the destination. The CSI parameters are obtained using a training structure and channel estimation protocol that requires only analog processing at the relay station.

In 602, A symbol sequence w representing the training sequence is formed where $w = [x_1 \ x_2] = [1 \ -1]$ In 604, the source transmits the symbol sequence w over two symbol intervals $t_{S,T,1}$ and $t_{S,2,T}$. This transmission is done using the single antenna present at the source.

In 606, the symbol sequence transmitted from the source is received at the two antennae of the relay station. At the first antenna, the symbol sequence consisting of the signal $r_{11,R,T}$ and $r_{12,R,T}$ are respectively received at the symbol intervals $t_{R,T,1}$ and $t_{R,T,2}$. At the second antenna, the symbol sequence consisting of the signal $r_{21,R,T}$ and $r_{22,R,T}$ are respectively received at the symbol intervals $t_{R,T,1}$ and $t_{R,T,2}$.

$$r_{R,T} = \begin{bmatrix} r_{11,R,T} & r_{12,R,T} \\ r_{21,R,T} & r_{22,R,T} \end{bmatrix} = \begin{bmatrix} h_{1,S} & -h_{1,S} \\ h_{2,S} & -h_{2,S} \end{bmatrix} + \begin{bmatrix} n_{11} & n_{12} \\ n_{21} & n_{22} \end{bmatrix}$$

$h_{1,S}$ is the channel coefficient between the source and the first antenna of the relay station while $h_{2,S}$ is the channel coefficient between the source and the second antenna of the relay station. $n_{ij}$ represents the additive noise present at the i-th antenna at the j-th time.

In 608, the symbol sequences in $r_{R,T}$ can then be arranged for transmission from the relay as Y where $$Y = \begin{bmatrix} y_{11} & y_{12} \\ y_{21} & y_{22} \end{bmatrix} = \begin{bmatrix} r_{11,R,T} & r_{12,R,T} \\ -r_{21,R,T}^* & r_{22,R,T}^* \end{bmatrix}$$

$$= \begin{bmatrix} h_{1,S} & -h_{1,S} \\ -h_{2,S}^* & -h_{2,S}^* \end{bmatrix} + \begin{bmatrix} n_{11} & n_{12} \\ n_{22}^* & -n_{21}^* \end{bmatrix}$$

In 610, the symbols $y_{11}$ and $y_{12}$ are transmitted from the first antenna of the relay respectively over two consecutive symbol intervals $t_{R,T,2}$ and $t_{R,T,3}$. The symbols $y_{21}$ and $y_{22}$ are transmitted from the second antenna of the relay respectively over two consecutive symbol intervals $t_{R,T,2}$ and $t_{R,T,3}$.

In other words, at the relay station, for each training session of two symbol intervals, the received sequence at the first antenna is transmit from the first antenna to the destination without any further processing. For the received sequence at the second antenna, the first symbol of the sequence is negated and conjugated before transmission from the second antenna to the destination, and the second symbol of the sequence is conjugated before transmission from the second antenna to the destination.

In 612, the symbol sequence transmitted from the relay is received at the antenna of the destination over two consecutive symbol intervals $t_{D,T,1}$ and $t_{D,T,2}$. At the destination, the symbol sequence consisting of signals $r_{D,T,1}$ and $r_{D,T,2}$ are respectively received during the intervals $t_{D,T,1}$ and $t_{D,T,2}$ and can be represented as $$[r_{D,T,1} \ r_{D,T,2}] = [h_{D,1} \ h_{D,2}] \begin{bmatrix} h_{1,S} & -h_{1,S} \\ -h_{2,S}^* & -h_{2,S}^* \end{bmatrix} +$$

$$[h_{D,1} \ h_{D,2}] \begin{bmatrix} n_{11} & n_{12} \\ n_{22}^* & -n_{21}^* \end{bmatrix} + [v_{1,D} \ v_{2,D}]$$

$$= [h_{D,1} h_{1,S} \ h_{D,2} h_{2,S}^*] \begin{bmatrix} 1 & -1 \\ -1 & -1 \end{bmatrix} +$$

$$[h_{D,1} \ h_{D,2}] \begin{bmatrix} n_{11} & n_{12} \\ n_{22}^* & -n_{21}^* \end{bmatrix} + [v_{1,D} \ v_{2,D}]$$

$h_{D,1}$ is the channel coefficient between the first antenna of the relay station and the destination, while $h_{D,2}$ is the channel coefficient between the second antenna of the relay station and the destination. $v_{1,D}$ and $v_{2,D}$ respectively represent the additive noise that is present in the signals $r_{D,T,1}$ and $r_{D,T,2}$.

In 614, the channel state information (CSI) parameters $h_{P,1}$ and $h_{P,2}$ characterizing the product channel can be estimated from $r_{D,T,1}$ and $r_{D,T,2}$ as $$\tilde{h}_{P,1} = \frac{1}{2}(r_{D,T,1} - r_{D,T,2})$$

$$\tilde{h}_{P,2} = -\frac{1}{2}(r_{D,T,1} - r_{D,T,2})$$

Alternative embodiments can also repeat the channel training and estimation of 602 to 614 multiple times. In this case, the channel state information (CSI) parameters $\tilde{h}_{P,1}$ and $\tilde{h}_{P,2}$ can be taken to be the mean of the multiple channel state information (CSI) parameters estimated.

ASTC Transmission Using Coding Scheme 5

The method of ASTC transmission according to this scheme will now be described referring again to FIG. 5.

In 502, two information symbols represented by $x_1$ and $x_2$ are arranged for transmission from the source. $x_1$ and $x_2$ may be from the payload sequence of the frame structure. $x_1$ and $x_2$ are then arranged to form the symbol sequence w.

$$w = [x_1 \ x_2]$$

In 504, the source to relay link is activated. The source transmits over two consecutive symbol intervals $t_{S,1}$ and $t_{S,2}$, the symbol sequence w. The symbols $x_1$ is transmitted in $t_{S,1}$ and $x_2$ is transmitted in $t_{S,2}$. This transmission is done using an antenna present at the source.

In 506, the symbol sequence transmitted from the source is received at the two antennae of the relay station over two consecutive symbol intervals $t_{R,1}$ and $t_{R,2}$. At the first antenna, the symbol sequence consisting of signals $r_{R,11}$ and $r_{R,12}$ are respectively received during the intervals $t_{R,1}$ and $t_{R,2}$. At the second antenna, the symbol sequence consisting of the signals $r_{R,21}$ and $r_{R,22}$ are respectively received during the intervals $t_{R,1}$ and $t_{R,2}$.

The signals received by the first and second antenna can be represented by a matrix $r_R$ where $$r_R = \begin{bmatrix} r_{R,11} & r_{R,12} \\ r_{R,21} & r_{R,22} \end{bmatrix}$$

$$= \begin{bmatrix} h_{1,S} \\ h_{2,S} \end{bmatrix} [x_1 \ x_2] + \begin{bmatrix} n_{11} & n_{12} \\ n_{21} & n_{22} \end{bmatrix}$$

$$= \begin{bmatrix} h_{1,S}x_1 + n_{11} & h_{1,S}x_2 + n_{12} \\ h_{2,S}x_1 + n_{21} & h_{2,S}x_2 + n_{22} \end{bmatrix}$$

$h_{1,S}$ is the channel coefficient between the source and the first antenna of the relay station while $h_{2,S}$ is the channel coefficient between the source and the second antenna of the relay station. $n_{ij}$ represents the additive noise present at the i-th antenna at the j-th time.

In 508, the signals $r_{R,11}$, $r_{R,12}$ $r_{R,21}$ and $r_{R,22}$ can then be arranged for transmission from the relay as Y. Y can preferably be Alamouti coded as $$Y = \begin{bmatrix} y_{11} & y_{12} \\ y_{21} & y_{22} \end{bmatrix} = \begin{bmatrix} r_{R,11} & r_{R,12} \\ r_{R,22}^* & -r_{R,21}^* \end{bmatrix}$$

In 510, the symbols $y_{11}$ and $y_{12}$ are transmitted from the first antenna of the relay respectively over two consecutive symbol intervals $t_{R,3}$ and $t_{R,4}$. The symbols $y_{21}$ and $y_{22}$ are transmitted from the second antenna of the relay respectively over two consecutive symbol intervals $t_{R,3}$ and $t_{R,4}$.

In other words, at the first antenna, the received symbol sequence is re-transmitted unchanged, and at the second antenna, the following operations are carried out before the signals are transmitted:
  i. the received symbols $r_{R,21}$ and $r_{R,22}$ are conjugated;
  ii. negate the odd-numbered symbols i.e. $-r_{R,21}$;
  iii. reverse the order of the even and odd-numbered symbols.

The operations i. to iii. are carried out in the analog domain, an example of which is in the radio frequency circuits, or at the output of the analog-to-digital converters (ADCs).

In 512, the symbol sequence transmitted from the relay is received at the antenna of the destination over two consecutive symbol intervals $t_{D,1}$ and $t_{D,2}$. At the destination, the symbol sequence consisting of signals $r_{D,1}$ and $r_{D,2}$ are respectively received during the intervals $t_{D,1}$ and $t_{D,2}$ and can be represented as $$[r_{D,1} \ r_{D,2}] = [h_{D,1} \ h_{D,2}] \begin{bmatrix} r_{R,11} & r_{R,12} \\ r_{R,22}^* & -r_{R,21}^* \end{bmatrix} + [v_1 \ v_2]$$

$$= [h_{D,1} \ h_{D,2}] \begin{bmatrix} h_{1,S}x_1 + n_{11} & h_{1,S}x_2 + n_{12} \\ h_{2,S}^*x_2^* + n_{22}^* & -h_{2,S}^*x_1^* - n_{21}^* \end{bmatrix} +$$

$$[v_1 \ v_2]$$

$$= [h_{D,1}h_{1,S} \ h_{D,2}h_{2,S}^*] \begin{bmatrix} x_1 & x_2 \\ x_2^* & -x_1^* \end{bmatrix} +$$

$$[h_{D,1} \ h_{D,2}] \begin{bmatrix} n_{11} & n_{12} \\ n_{22}^* & -n_{21}^* \end{bmatrix} + [v_1 \ v_2]$$

$h_{D,1}$ is the channel coefficient between the first antenna of the relay station and the destination, while $h_{D,2}$ is the channel coefficient between the second antenna of the relay station and the destination. $v_1$ and $v_2$ respectively represent the additive noise present in the signals $r_{D,1}$ and $r_{D,2}$ at the destination.

Signals $r_{D,1}$ and $r_{D,2}$ then work out to be $$\begin{bmatrix} r_{D,1} \\ r_{D,2}^* \end{bmatrix} = \begin{bmatrix} h_{D,1}h_{1,S} & h_{D,2}h_{2,S}^* \\ -h_{D,2}^*h_{2,S} & h_{D,1}^*h_{1,S}^* \end{bmatrix} \begin{bmatrix} x_1 \\ x_2 \end{bmatrix} + \begin{bmatrix} h_{D,1}n_{11} + h_{D,2}n_{22}^* + v_1 \\ h_{D,1}^*n_{12}^* - h_{D,2}^*n_{21} + v_2^* \end{bmatrix}$$

In 514, estimates of the information symbols $\tilde{x}_1$, and $\tilde{x}_2$ can then be obtained using a linear operation as $$\begin{bmatrix} \tilde{x}_1 \\ \tilde{x}_2^* \end{bmatrix} = \begin{bmatrix} h_{D,1}h_{1,S} & h_{D,2}h_{2,S}^* \\ -h_{D,2}^*h_{2,S} & h_{D,1}^*h_{1,S}^* \end{bmatrix}^H \begin{bmatrix} r_{D,1} \\ r_{D,2}^* \end{bmatrix}$$

$$= (|h_{D,1}|^2|h_{1,S}|^2 + |h_{D,2}|^2|h_{2,S}|^2) \begin{bmatrix} x_1 \\ x_2^* \end{bmatrix} + \begin{bmatrix} \tilde{v}_1 \\ \tilde{v}_2 \end{bmatrix}$$

where $\tilde{v}_1 = h_{D,1}^*h_{1,S}^*(h_{D,1}n_{11} + h_{D,2}n_{22}^* + v_1) - h_{D,2}h_{2,S}^*(h_{D,1}^*n_{12}^* - h_{D,2}^*n_{21} + v_2^*)$ $\tilde{v}_2 = h_{D,2}h_{2,S}^*(h_{D,1}n_{11} + h_{D,2}n_{22}^* + v_1) + h_{D,1}h_{1,S}(h_{D,1}^*n_{12}^* - h_{D,2}^*n_{21} + v_2^*)$ Coding Scheme 6

A fifth alternative coding scheme will now be described below using FIG. 6.

In the coding scheme, the frame structure would have the following additional requirements for the header sequence and training sequence:
  The header sequences used by each of the two sources should have as low as possible a cross-correlation, e.g., orthogonal sequences.

The training sequences used by each of the two sources should be orthogonal. This requires at least two symbols of training signals to be used by each source. For example, the first source can transmit w=[1 1], and the second source, w=[1 −1].

For this coding scheme to be adopted in OFDM systems, ranging needs to be performed so as to align the received signals at the relay in the cyclic prefix window.

Channel Training and Estimation Using Coding Scheme 6

Channel training and estimation can be done in the same manner as that for Coding Scheme 5.

ASTC Transmission Using Coding Scheme 6

The ASTC transmission method according to this scheme will now be described referring to FIG. 5.

In 502, information symbols are arranged for transmission from the first source and the second source. $x_{i,j}$ denotes the signal transmitted from the i-th source during the j-th symbol interval.

In 504, the links between the first source and the relay, and the second source and the relay are activated. The transmission is done from both sources to the relay over two consecutive symbol intervals $t_{S,1}$ and $t_{S,2}$. The first source transmits the symbol $x_{1,1}$ in $t_{S,1}$ and $x_{1,2}$ in $t_{S,2}$. The second source transmits the symbol $x_{2,1}$ in $t_{S,1}$ and $x_{2,2}$ in $t_{S,2}$.

In 506, the symbol sequences transmitted from both sources are received at the two antennae of the relay station over two consecutive symbol intervals $t_{R,1}$ and $t_{R,2}$. At the first antenna, the symbol sequence consisting of signals $r_{R,11}$ and $r_{R,12}$ are respectively received during the intervals $t_{R,1}$ and $t_{R,2}$. At the second antenna, the symbol sequence consisting of the signals $r_{R,21}$ and $r_{R,22}$ are respectively received during the intervals $t_{R,1}$ and $t_{R,2}$.

Assuming perfect synchronization, the signals received by the first and second antenna can be represented by a matrix $r_R$ where $$r_R = \begin{bmatrix} r_{R,11} & r_{R,12} \\ r_{R,21} & r_{R,22} \end{bmatrix}$$

$$= \begin{bmatrix} h_{1,1} \\ h_{2,1} \end{bmatrix} [x_{1,1} \ x_{1,2}] + \begin{bmatrix} h_{1,2} \\ h_{2,2} \end{bmatrix} [x_{2,1} \ x_{2,2}] + \begin{bmatrix} n_{11} & n_{12} \\ n_{21} & n_{22} \end{bmatrix}$$

$$= \begin{bmatrix} h_{1,1}x_{1,1} + h_{1,2}x_{2,1} + n_{11} & h_{1,1}x_{1,2} + h_{1,2}x_{2,2} + n_{12} \\ h_{2,1}x_{1,1} + h_{2,2}x_{2,1} + n_{21} & h_{2,1}x_{1,2} + h_{2,2}x_{2,2} + n_{22} \end{bmatrix}$$

$h_{i,kj}$ denotes the channel coefficients corresponding to the i-th antenna of the relay station and the k-th source. $n_{ij}$ represents the additive noise present in the received signals at the i-th antenna during the j-th time.

In 508, the signals $r_{R,11}$, $r_{R,12}$, $r_{R,21}$ and $r_{R,22}$ can then be arranged for transmission from the relay as Y. Y can preferably be Alamouti coded as $$Y = \begin{bmatrix} y_{11} & y_{12} \\ y_{21} & y_{22} \end{bmatrix} = \begin{bmatrix} r_{R,11} & r_{R,12} \\ r_{R,22}^* & -r_{R,21}^* \end{bmatrix}$$

The coding scheme used for this scheme is similar to that used for Coding Schemes 1 to 5 for single-direction relays. This may have the advantage that the coding operations at the relay node may be carried out in the analog domain.

In 510, the symbols $y_{11}$ and $y_{12}$ are transmitted from the first antenna of the relay respectively over two consecutive symbol intervals $t_{R,3}$ and $t_{R,4}$. The symbols $y_{21}$ and $y_{22}$ are transmitted from the second antenna of the relay respectively over two consecutive symbol intervals $t_{R,3}$ and $t_{R,4}$.

In other words, at the first antenna, the received symbol sequence is re-transmitted unchanged, and at the second antenna, the following operations are carried out before the signals are transmitted:
  i. the received symbols $r_{R,21}$ and $r_{R,22}$ are conjugated;
  ii. negate the odd-numbered symbols i.e. $-r_{R,21}^*$;
  iii. reverse the order of the even and odd-numbered symbols.

The operations i. to iii. can be carried out in the analog domain, an example of which is in the radio frequency circuit, or at the output of the analog-to-digital converters (ADCs).

In 512, the symbol sequence transmitted from the relay is received at the antenna of both destinations over two consecutive symbol intervals $t_{D,1}$ and $t_{D,2}$. Assuming symmetric channels, the received signals are Alamouti-coded and can be represented at each destination as $$[r_{K,1} \ r_{K,2}] = [h_{1,K} \ h_{2,K}] \begin{bmatrix} r_{R,11} & r_{R,12} \\ r_{R,22}^* & -r_{R,21}^* \end{bmatrix} + [v_{K,1} \ v_{K,2}]$$

where K=1 for the first destination and K=2 for the second destination. According to the example embodiment, the first destination can be the same node as the first source, as is the second destination can be the same node as the second source. Alternative embodiments however are possible within the scope of the invention as will be clear to a skilled reader, for example where both sources are completely different nodes from the destinations.

At the first destination, after subtracting the signal components related to $x_{1,1}$ and $x_{1,2}$, i.e., $$[(h_{1,1})^2 \ |h_{2,1}|^2] \begin{bmatrix} x_{1,1} & x_{1,2} \\ x_{1,2}^* & -x_{1,1}^* \end{bmatrix}$$

where $|h_{2,1}|^2 = h_{2,1}h_{2,1}^*$, the symbol sequence consisting of signals $r_{1,1}$ and $r_{1,2}$ are respectively received during the intervals $t_{D,1}$ and $t_{D,2}$ and can be represented as $$[r_{1,1} \ r_{1,2}] = [h_{1,1} \ h_{2,1}] \begin{bmatrix} h_{1,2}x_{2,1} + n_{11} & h_{1,2}x_{2,2} + n_{12} \\ h_{2,2}^*x_{2,2}^* + n_{22}^* & -h_{2,2}^*x_{2,1}^* - n_{21}^* \end{bmatrix} +$$

$$[v_{1,1} \ v_{1,2}]$$

$$= [h_{1,1}h_{1,2} \ h_{2,1}h_{2,2}^*] \begin{bmatrix} x_{2,1} & x_{2,2} \\ x_{2,2}^* & -x_{2,1}^* \end{bmatrix} +$$

$$[h_{1,1} \ h_{2,1}] \begin{bmatrix} n_{11} & n_{12} \\ n_{22}^* & -n_{21}^* \end{bmatrix} + [v_{1,1} \ v_{1,2}]$$

$v_{1,1}$ and $v_{1,2}$ respectively represent the additive noise that is present in the signals $r_{1,1}$ and $r_{1,2}$.

At the second destination, after subtracting the signal components related to $x_{2,1}$ and $x_{2,2}$, i.e., $$[(h_{1,2})^2 \ |h_{2,2}|^2] \begin{bmatrix} x_{2,1} & x_{2,2} \\ x_{2,2}^* & -x_{2,1}^* \end{bmatrix}$$

where $|h_{2,2}|^2 = h_{2,2}h_{2,2}^*$, the symbol sequence consisting of signals $r_{2,1}$ and $r_{2,2}$ are respectively received during the intervals $t_{D,1}$ and $t_{D,2}$ and can be represented as $$[r_{2,1} \quad r_{2,2}] = [h_{1,2} \quad h_{2,2}] \begin{bmatrix} h_{1,1}x_{1,1} + n_{11} & h_{1,1}x_{1,2} + n_{12} \\ h_{2,1}^*x_{1,2}^* + n_{22}^* & -h_{2,1}^*x_{1,1}^* - n_{21}^* \end{bmatrix} +$$
$$[v_{2,1} \quad v_{2,2}]$$
$$= [h_{1,1}h_{1,2} \quad h_{2,1}^*h_{2,2}] \begin{bmatrix} x_{1,1} & x_{1,2} \\ x_{1,2}^* & -x_{1,1}^* \end{bmatrix} +$$
$$[h_{1,2} \quad h_{2,2}] \begin{bmatrix} n_{11} & n_{12} \\ n_{22}^* & -n_{21}^* \end{bmatrix} + [v_{2,1} \quad v_{2,2}]$$

$v_{2,1}$ and $v_{2,2}$ respectively represent the additive noise that is present in the signals $r_{2,1}$ and $r_{2,2}$.

Using the notation of $r_{K,1}$ and $r_{K,2}$, as well as K=1 for the first destination and K=2 for the second destination, the signals $r_{K,1}$ and $r_{K,2}$ work out to be $$\begin{bmatrix} r_{K,1} \\ r_{K,2}^* \end{bmatrix} = \begin{bmatrix} h_{K,1}h_{1,K} & h_{K,2}h_{2,K}^* \\ -h_{K,2}^*h_{2,K} & h_{K,1}^*h_{1,K}^* \end{bmatrix} \begin{bmatrix} x_{K,1} \\ x_{K,2}^* \end{bmatrix} + \begin{bmatrix} h_{K,1}n_{11} + h_{K,2}n_{22}^* + v_{K,1} \\ h_{K,1}^*n_{12}^* - h_{K,2}^2 n_{21} + v_{K,2}^* \end{bmatrix}$$

In 514, estimates of the information symbols $\tilde{x}_{K,1}$ and $\tilde{x}_{K,2}$ can then be obtained using a linear operation as $$\begin{bmatrix} \tilde{x}_{K,1} \\ \tilde{x}_{K,2}^* \end{bmatrix} = \begin{bmatrix} h_{K,1}h_{1,K} & h_{K,2}h_{2,K}^* \\ -h_{K,2}^*h_{2,K} & h_{K,1}^*h_{1,K}^* \end{bmatrix}^H \begin{bmatrix} r_{K,1} \\ r_{K,2}^* \end{bmatrix}$$
$$= (|h_{K,1}|^2|h_{1,K}|^2 + |h_{K,2}|^2|h_{2,K}|^2) \begin{bmatrix} x_{K,1} \\ x_{K,2}^* \end{bmatrix} + \begin{bmatrix} \tilde{v}_{K,1} \\ \tilde{v}_{K,2} \end{bmatrix}$$

where
$$\tilde{v}_{K,1} = h_{K,1}^*h_{1,K}^*(h_{K,1}n_{11} + h_{K,2}n_{22}^* + v_{K,1}) -$$
$$h_{K,2}h_{2,K}^*(h_{K,1}^*n_{12}^* - h_{K,2}^*n_{21} + v_{K,2}^*)$$
$$\tilde{v}_{K,2} = h_{K,2}h_{2,K}^*(h_{K,1}n_{11} + h_{K,2}n_{22}^* + v_{K,1}) +$$
$$h_{K,1}h_{1,K}(h_{K,1}^*n_{12}^* - h_{K,2}^*n_{21} + v_{K,2}^*)$$

and $[\;]^H$ refers to performing a conjugate transpose.

Cyclic Prefix Insertion

The frame structure 700 is arranged for transmission over multiple symbols. This transmission can be carried out using any one of Coding Schemes 1 to 6. In order to mitigate the effect of the inter-symbol interference (ISI) caused by frequency selective fading, cyclic prefix insertion is performed at the transmitter of the source and/or the relay station to each of the symbols.

Figure 9:
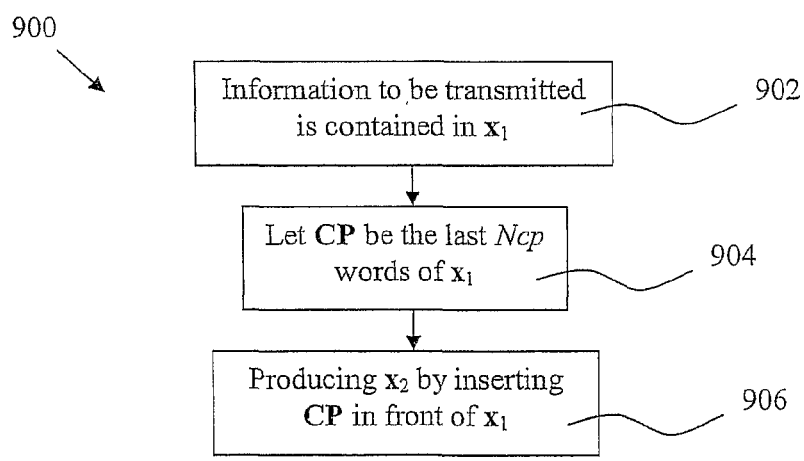
FIG. 9 is a flow diagram of a method for deriving a cyclic prefix according to the example embodiment.

FIG. 9 shows a method of inserting a cyclic prefix. In 902, the information to be transmitted is contained in a symbol sequence $x_1$ consisting of N words denoted by $x_n$ where n=0 . . . N–1, i.e.

$$x_1 = [x_0 \ldots x_n \ldots x_{N-1}]$$

In 904, a cyclic prefix CP of length Ncp is created by copying the last Ncp words of $x_1$ $$CP = [x_{N-Ncp} \ldots x_{N-2} \ldots x_{N-1}]$$

In 906, the cyclic prefix CP is inserted in front of $x_1$, producing the resultant symbol $x_2$ for transmission $$x_2 = \left[ \underbrace{\begin{matrix} x_{N-Ncp} & \ldots & x_{N-2} & x_{N-1} \end{matrix}}_{Cyclic\ Prefix} \underbrace{\begin{matrix} x_0 & \ldots & x_n & \ldots & x_{N-1} \end{matrix}}_{x_1} \right]$$

Symbol Conjugation

To perform conjugation in the frequency domain as is done by the ASTC schemes, an OFDM symbol sequence denoted by $x_A$ that is without a cyclic prefix can be reversed and conjugated as time domain symbols to produce $x_B$. The following mapping can be used:

$$x_B(n) = \begin{cases} x_A(n), & \text{when } n = 0 \\ x_A(N-n), & \text{otherwise} \end{cases}$$

where $x_A(n)$ and $x_B(n)$ respectively denote the n-th word in the symbols $x_A$ and $x_B$. N denotes the number of words present in $x_A$ or $x_B$. The resultant $x_B$ is $$X_B = [x_0\ x_{N-1} \ldots x_1]$$

$x_B$ is conjugated in the time domain to produce $x_B^*$.

$x_B^*$ is a valid OFDM symbol without a cyclic prefix. When an N-point discrete Fourier transform (DFT) is performed on $x_B^*$, the format will be maintained because of the reversal in the order of the word sequence.

In an alternative embodiment, to achieve the conjugation in frequency domain required by the ASTC schemes, an OFDM symbol sequence $x_A$ comprising a cyclic prefix of the length Ncp and N words can be reversed and conjugated as time domain symbols to produce $x_B$. The following mapping can be used:

$$x_B(n) = x_A(N_A - n - 1)$$

where $x_A(n)$ and $x_B(n)$ respectively denote the n-th word in the symbols $x_A$ and $X_B$. $N_A$ is the number of words in $x_A$ such that $N_A = N + Ncp$. The resultant $x_B$ will be a reversal of $x_A$, i.e.

$$X_B = [x_{N-1} \ldots x_n \ldots x_0\ x_{N-1}\ x_{N-2} \ldots x_{N-Ncp}]$$

The resultant $x_B$ is conjugated in the time domain to produce $x_B^*$.

$x_B^*$ is a valid OFDM symbol with a cyclic prefix. When an N-point discrete Fourier transform (DFT) is performed on $x_B^*$, the format will be maintained because of the reversal in the order of the word sequence. Therefore, the inter-symbol interference (ISI) mitigation property maintains.

When conjugation is performed in the time domain to produce $x_B^*$, the corresponding frequency domain sequence for $x_B$ will be $$X^*(k)W_N^{k(N-Ncp-1)} = X^*(k)W_N^{-k(Ncp+1)}$$

i.e., the phase-shifted conjugate sequence.

The symbol conjugation method makes use of the Discrete Fourier Transform (DFT) properties of:

Linearity: $ax(n) + by(n) \Leftrightarrow aX(k) + bY(k)$;

Cyclic Shift $x((n+m)_N) \Leftrightarrow W_N^{-km}X(k)$;

Symmetry $x^*((-n)_N) \Leftrightarrow X^*(k)$ where we use $x(n)$ and $y(n)$ to denote the time domain sequence, $X(k)$ and $Y(k)$ their corresponding frequency domain sequence, N the DFT size, and $$W_N = \exp\left(-j\frac{2\pi}{N}\right).$$

The symbol conjugation method may have the advantage that only analog domain processing has to be done at the relay, and only linear processing has to be done for maximum likelihood decoding at the destination for each subcarrier.

Cyclic Prefix Scheme 1

Figure 10:
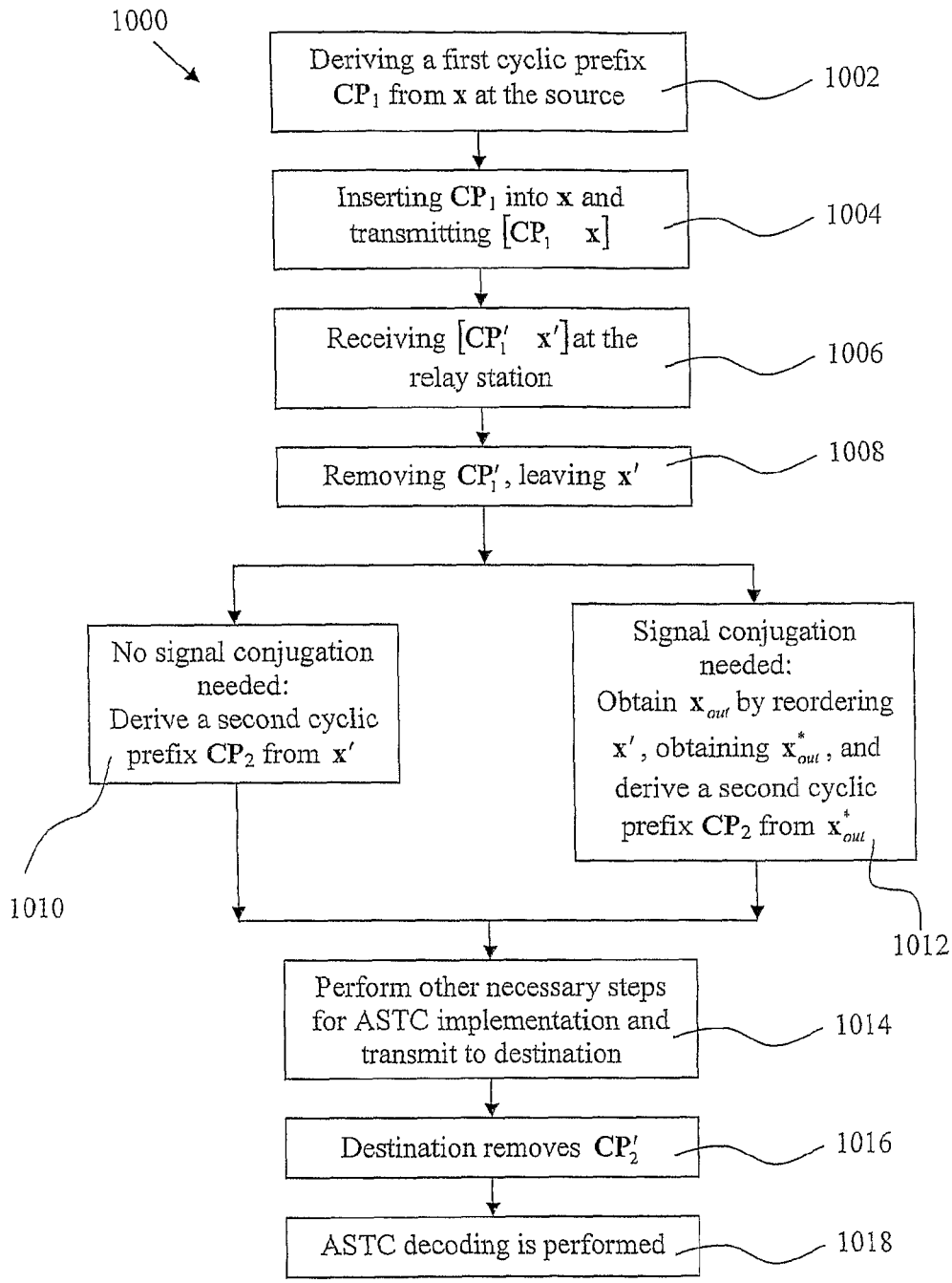
FIG. 10 is a flow diagram of a scheme for inserting cyclic prefixes according to the example embodiment.

FIG. 10 shows a scheme for inserting cyclic prefixes according to the example embodiment. Let x be the symbol sequence that is to be transmitted.

In 1002, the source derives a first cyclic prefix (denoted $CP_1$) with length $\tau_{CP1}$ such that $\tau_{CP1} \geq \max\{\tau_{S \to Ri}\}$. $\tau_{S \to Ri}$ represents the maximum delay spread from the source to the i-th relay antenna (denoted here as Ri) in terms of number of sample durations.

In 1004, the source inserts $CP_1$ in front of x. and then transmits the resultant symbol sequence [$CP_1$ x].

In 1006, the relay station receives [$CP_1'$ x'].

In 1008, after performing time synchronization, the $CP_1'$ portion with length $\tau_{CP1}$ in each OFDM symbol is removed leaving x'.

In 1010, if no signal conjugation is needed, a second cyclic prefix (denoted $CP_2$) with length $\tau_{CP2} \geq \max\{\tau_{Ri \to D}\}$ is derived from x' for each OFDM symbol and inserted in front of x', resulting in the sequence [$CP_2$ x']. When the antennas are distributed across multiple relays, $\tau_{CP2}$ is chosen such that $\tau_{CP2} \geq \max\{\tau_{R1 \to D}, \tau_{R2 \to D}, \ldots, \tau_{Ri \to D}, \ldots, \tau_{RNr \to D}\}$ i.e. $\tau_{CP2}$) represents the maximum delay spread from the i-th relay (i.e. Ri) to the destination in terms of the number of sample durations. $N_r$ denotes the number of antenna or antennae present at the relay station.

In 1012, if signal conjugation is needed, the OFDM symbol sequence is reordered according to $$x_{out}(n) = \begin{cases} x_{in}(n), & \text{when } n = 0 \\ x_{in}(N_{Xin} - n), & \text{otherwise} \end{cases}$$

where $x_{in}$=[x'], $N_{Xin}$ denotes the length of $x_{in}$, and n=0, 1, ..., $N_{Xin}$-1. The conjugate of $x_{out}$ is then derived and denoted as $x_{out}^*$. A second cyclic prefix (denoted $CP_2$) with length $\tau_{CP2}$ is then derived from $x_{out}^*$ and inserted ahead of $x_{out}^*$, resulting in the sequence [$CP_2$ $x_{out}^*$].

In 1014, other necessary steps for the ASTC implementation at the relay station performed and then the symbol sequence of either [$CP_2$ x'] or [$CP_2$ $x_{out}^*$] is transmitted to the destination.

In 1016, the destination receives either [$CP_2'$ x''] or [$CP_2'$ $x_{out}'^*$]. After frame synchronization, the destination removes the CP; with length $\tau_{CP2}$ in each OFDM symbol.

In 1018, the destination performs the ASTC decoding in the frequency domain.

Cyclic Prefix Scheme 2

Figure 11:
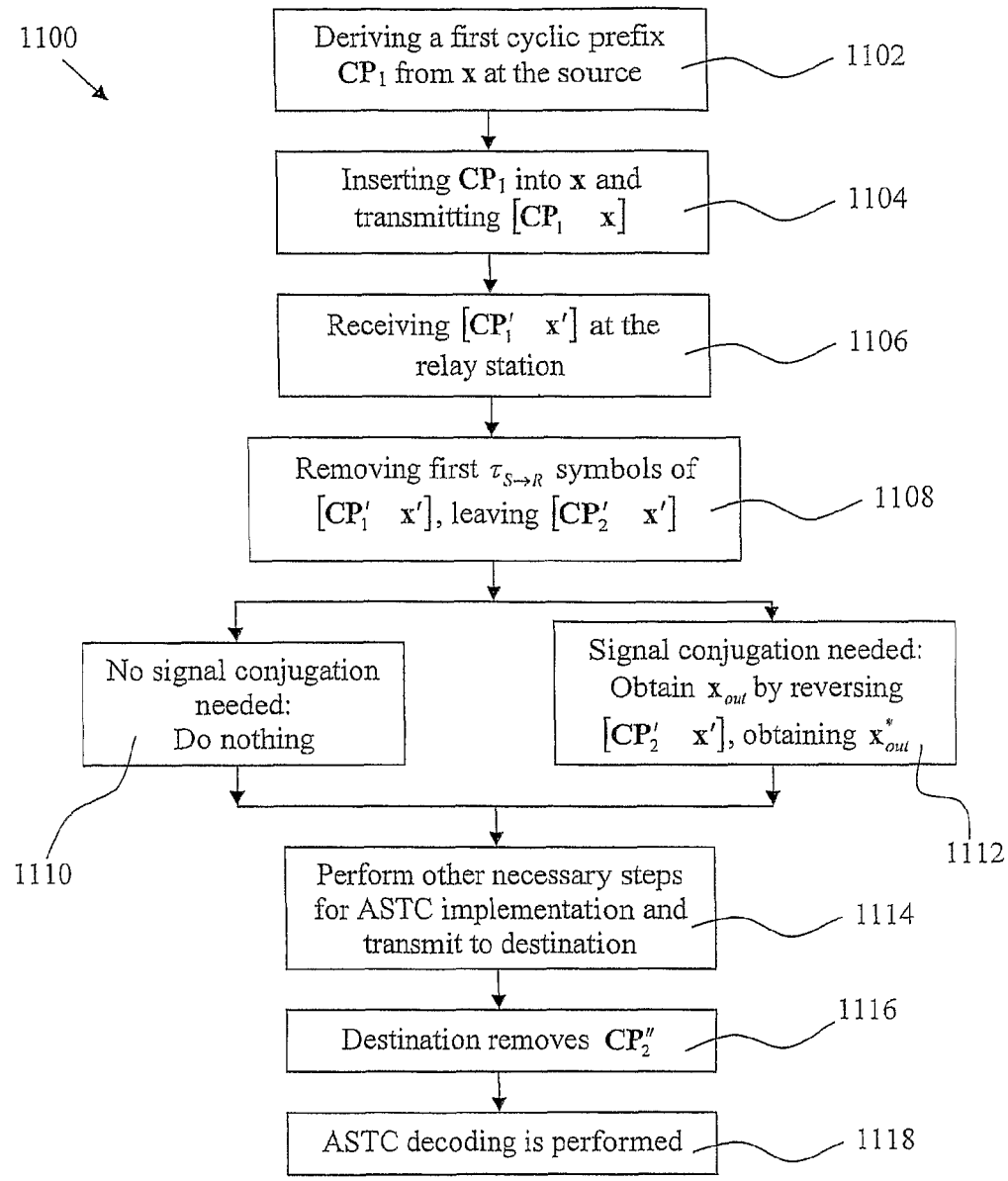
FIG. 11 is a flow diagram of an alternative scheme for inserting cyclic prefixes according to the example embodiment.

The maximum delay spread of the source to relay station channels is denoted as $\tau_{S \to R}$ sample durations, and the maximum delay spread of the relay station to destination channels is denoted as $\tau_{R \to D}$ sample durations. The delay spread of the product channel is denoted by $\tau_P$ where $\tau_P = \tau_{S \to R} + \tau_{R \to D} - 1$, $\tau_{S \to R} = \max\{\tau_{S \to Ri}\}$, $\tau_{R \to D} = \max\{\tau_{Ri \to D}\}$. FIG. 11 shows an alternative scheme for inserting cyclic prefixes according to the example embodiment. Let x be the symbol sequence that is to be transmitted.

In 1102, the source derives a first cyclic prefix (denoted $CP_1$) with length $\tau_{CP1} \geq \tau_{S \to R} + \tau_{R \to D}$. In order to completely mitigate the ISI, $\tau_{CP1}$ should not be shorter than $\tau_P$.

In 1104, the source inserts $CP_1$ into x. and then transmits the resultant symbol sequence [$CP_1$ x].

In 1106, the relay station receives [$CP_1'$ x']. In step 1108, after performing time synchronization, the first $\tau_{S \to R}$ symbols in the $CP_1'$ portion of each OFDM symbol is removed, leaving a sequence represented as [$CP_2'$ x']. The resulting OFDM symbol will then have $N_R = N + \tau_{CP2}$ or $N_R = N + \tau_P - \tau_{S \to R}$ signals.

In step 1110, if no signal conjugation is needed, no processing is done. In step 1112, if signal conjugation is needed, the OFDM symbol sequence is reversed to produce the output sequence $$x_{out}(n) = x_{in}(N_R - n - 1)$$

where $x_{in}$=[$CP_2'$ x'], $N_R$ denotes the length of [$CP_2'$ x'], and n=0, 1, ..., $N_R$-1. The conjugate of $x_{out}$ is then derived and denoted as $x_{out}^*$.

In 1114, other necessary steps for the ASTC implementation at the relay station are performed and then the symbol sequence of either [$CP_2'$ x'] or [$x_{out}^*$] is transmitted to the destination.

In 1116, the destination receives either [$CP_2''$ x''] or [$x_{out}'^*$]. After frame synchronization, the destination removes the $CP_2''$ from each OFDM with length $\tau_{CP2} = \tau_P - \tau_{S \to R}$ from each OFDM symbol In 1118, ASTC decoding is performed in the frequency domain.

Alternative embodiments may have more than two antennas at the relay station, in which case antenna selection can be adopted. Only two antennas are selected to implement the proposed schemes based on pre-defined selection criteria, e.g., best product channel SNR, etc.

Alternative embodiments may also have multiple relay stations where relay selection can be performed in which one relay station is selected to implement the proposed schemes based on pre-determined selection criteria, e.g., best product channel SNR, etc. Alternative embodiments may also have multiple relay stations where Coordinated Delay ASTC is implemented at each relay station, and the coordinated delays are applied at different relay station. In this case, the delay durations applied at the different relay station is a design parameter obtained from a central control. This embodiment may have the advantage that the carrier frequencies do not have to be orthogonal and thus signal collisions will not occur.

A further possibility is to implement cooperation using at least two relay stations. Using Code Schemes 1 to 3, information passing is implemented between the at least two relay stations and the at least two relay stations can then participate in the ASTC transmission.

Although the described embodiment does not include power scaling at the source and relay nodes, but this may be employed depending on the type of deployment. For example, the power scaling may be incorporated in the channel estimation and therefore it is transparent to the above proposed schemes.

While example embodiments of the invention have been described in detail, many variations are possible within the scope of the invention as will be clear to a skilled reader.

The invention claimed is:

1. An analog space-time relay method for a wireless communication relay channel, the wireless communication relay channel including first and second relay antennas arranged to relay an information signal transmitted from a source station to a destination station, the method comprising the steps of:
   (i) receiving a first symbol sequence at the first relay antenna, the first symbol sequence comprising the information signal and a first noise element;
   (ii) receiving a second symbol sequence at the second relay antenna, the second symbol sequence comprising the information signal and a second noise element;

(iii) transmitting a first signal by the first relay antenna, the first signal being associated with the second symbol sequence received at the second relay antenna;

(iv) transmitting a second signal by the second relay antenna, the second signal being associated with the first symbol sequence received at the first relay antenna.

2. An analog space-time relay method according to claim 1, wherein the second symbol sequence includes a complex conjugate of the information signal, and the method further comprises the step of negating the complex conjugate of the information signal for deriving the first signal.

3. An analog space-time relay method according to claim 2, further comprising the step of combining the negated complex conjugate of the information signal and the first symbol sequence for deriving the first signal.

4. An analog space-time relay method according to claim 1, further comprising the step of combining the first and second symbol sequences to obtain the second signal.

5. An analog space-time relay method according to claim 1, further comprising the step of encoding the first and second signals using Alamouti coding prior to the respective transmissions.

6. An analog space-time relay method according to claim 1, wherein the information symbol includes at least one training signal and the method further comprises the steps of: encoding the first and second received symbol sequences using Alamouti coding to obtain the first and second signals for transmission by the respective relay antennas.

7. An analog space-time relay method according to claim 6, further comprising the step of, at the destination station, negating the first and second signals to obtain channel estimates for the wireless communication relay channel.

8. An analog space-time relay method according to claim 6, further comprising the step of, at the destination station, calculating a mean of the first and second signals to obtain channel estimates for the wireless communication relay channel.

9. An analog space-time relay method according to claim 1, wherein the information symbol includes two consecutive symbols.

10. An analog space-time relay method according to claim 9, wherein the first symbol sequence includes a combination of the two consecutive symbols and the second symbol sequence includes a difference of the two consecutive symbols.

11. An analog space-time relay method according to claim 10, further comprising the steps of, combining the first and second symbol sequence for deriving the first signal for the first relay antenna; combining the first and second symbol sequence at the second relay antenna for deriving the second signal for the second relay antenna.

12. An analog space-time relay method according to claim 11, further comprising the steps of encoding the combined first and second symbol sequences using Alamouti coding to form the first and second signals for transmission by the respective relay antennas.

13. An analog space-time relay method according to claim 1, wherein the information symbol includes at least one training signal, and the first signal includes a conjugate of the second symbol sequence received at the second relay antenna.

14. An analog space-time relay method according to claim 13, further comprising the step of: re-transmitting the first symbol sequence by the first relay antenna at a symbol interval different from the transmission of the first signal.

15. An analog space-time relay method according to claim 13, wherein the second signal includes a negative conjugate of the first symbol sequence received at the first relay antenna.

16. An analog space-time relay method according to claim 15, further comprising the step of: re-transmitting the second symbol sequence by the second relay antenna at a symbol interval different from the transmission of the second signal.

17. An analog space-time relay method according to claim 13, further comprising the step of, at the destination station, negating the first and second signals to obtain channel estimates for the wireless communication relay channel.

18. An analog space-time relay method according to claim 13, further comprising the step of, at the destination station, calculating a mean of the first and second signals to obtain channel estimates for the wireless communication relay channel.

19. An analog space-time relay method according to claim 13, wherein the first symbol sequence is re-transmitted by the first relay antenna over first and second symbols intervals, and the method further comprises the step of transmitting a negative conjugate of the second symbol sequence received at the second relay antenna over a third symbol interval.

20. An analog space-time relay method according to claim 19, wherein the first signal is transmitted over a fourth symbol interval.

21. An analog space-time relay method according to claim 20, further comprising the steps of, simultaneously, transmitting a negative second symbol sequence by the second relay antenna over the first symbol interval and re-transmitting the second symbol sequence by the second relay antenna over the second symbol interval.

22. An analog space-time relay method according to claim 21, wherein the second signal which includes the negative conjugate of the first symbol sequence is transmitted over the third and fourth symbol intervals.

23. An analog space-time relay method according to claim 1, wherein the information symbol includes even number of symbols.

24. An analog space-time relay method according to claim 23, further comprising the step of combining the first and second symbol sequences to obtain the first and second signals at the respective antennas.

25. An analog space-time relay method according to claim 23, further comprising the step of encoding the first and second signals using Alamouti coding prior to the respective transmissions.

26. An analog space-time relay method according to claim 1, further comprising the steps of combining the first and second symbol sequences to form the first signal and transmitting the first signal over a first symbol interval.

27. An analog space-time relay method according to claim 26, further comprising the steps of: negating the first signal; and transmitting the negated first signal over a second symbol interval.

28. An analog space-time relay method according to claim 27, further comprising the steps of: obtaining a complex conjugate of the first signal; and transmitting the complex conjugate of the first signal over a third and fourth symbol interval.

29. An analog space-time relay method according to claim 26, further comprising the steps of, simultaneously, combining the first and second sequences to form the second signal, obtaining a complex conjugate of the second signal, negating the complex conjugate of the second signal, and transmitting the negated complex conjugate of the second signal over the first and second symbol intervals.

30. An analog space-time relay method according to claim 29, wherein the second signal is transmitted over the third symbol interval.

31. An analog space-time relay method according to claim 30, further comprising the steps of negating the second signal and transmitting the negated second signal over a fourth symbol interval.

32. An analog space-time relay method according to claim 1, wherein the information symbol is modulated using OFDM.

33. An analog space-time relay method according to claim 1, wherein the information symbol is modulated using Single Carrier-Cyclic Prefix.

34. An analog space-time relay method according to claim 1, wherein the first and second signals are coded using a coding matrix based on the number of antennas at the relay station.

35. An analog space-time relay method according to claim 1, further comprising the step of performing linear processing at the destination station.

36. An analog space-time relay method according to claim 1, wherein the first and second antennas are located at the same relay station.

37. An analog space-time relay method according to claim 1, wherein the first and second antennas are located at different relay stations.

38. An analog space-time relay method according to claim 1, wherein the first noise element includes additive noise of the communication relay channel.

39. An analog space-time relay method according to claim 1, wherein the second noise element includes additive noise of the communication relay channel.

40. An analog space-time relay method according to claim 1, wherein the information signal from the source further comprises a cyclic prefix, and wherein the method further comprises the step of removing part of the cyclic prefix at the relay station; and transmitting the remaining part of the cyclic prefix with the first signal or the second signal to the destination.

41. An analog space-time relay method according to claim 1, wherein the information signal from the source further comprises a cyclic prefix, and wherein the method further comprises the steps of:
removing the cyclic prefix at the relay station;
generating a second cyclic prefix at the relay station; and
appending the second cyclic prefix to the first signal or the second signal for transmission to the destination.

42. An analog space-time relay method according to claim 1, wherein the first symbol sequence further comprises a further information signal transmitted from a further source station destined for a further destination station.

43. An analog space-time relay method according to claim 42, wherein the information signal comprises a first header and the further information signal comprises a second header, a cross-correlation value obtained by correlating the first header and the second header with no offset is equal to a cross-correlation value obtained by correlating the first and the second header with offset greater than zero.

44. An analog space-time relay method according to claim 1, wherein the second symbol sequence further comprises a further information signal transmitted from a further source station destined for a further destination station.

45. An analog space-time relay method for a wireless communication relay channel, the wireless communication relay channel including first and second relay antennas arranged to relay an information signal transmitted from a source station to a destination station, the method comprising the steps of:
(i) receiving a first symbol sequence at the first relay antenna and the first relay antenna retransmitting the first symbol sequence as a first signal, the first symbol sequence comprising the information signal and a first noise element;
(ii) receiving a second symbol sequence at the second relay antenna, the second symbol sequence comprising the information signal and a second noise element;
(iii) transmitting a second signal by the second relay antenna, the second signal being a reordering of the second symbol sequence.

46. An analog space-time relay method according to claim 45, wherein the second signal is a reversal in the order of the second symbol sequence.

47. An analog space-time relay method according to claim 45, further comprising the step of obtaining a complex conjugate of the reordered second symbol sequence.

48. An analog space-time relay method according to claim 47, further comprising the step of negating odd numbered symbols of the complex conjugated reordered second symbol sequence.

49. An analog space-time relay method according to claim 48, further comprising the step of reversing the order of the even and odd numbered symbols of the complex conjugate second symbol sequence to form the second signal.

50. An analog space-time relay method according to claim 45, further comprising the step of encoding the first and second signals using Alamouti coding prior to the respective transmissions.

51. An analog space-time relay method according to claim 45, wherein the information signal includes a first training signal and a second training signal, the second training signal being a negation of the first training signal.

52. An analog space-time relay method according to claim 51, further comprising the steps of transmitting the first training signal over a first symbol interval and transmitting the second training signal over a second symbol interval, the second symbol interval occurring after the first symbol interval.

53. An analog space-time relay method according to claim 51, further comprising the step of, at the destination station, negating the first and second signals to obtain channel estimates for the wireless communication relay channel.

54. An analog space-time relay method according to claim 51, further comprising the step of, at the destination station, calculating a mean of the first and second signals to obtain channel estimates for the wireless communication relay channel.

55. Apparatus for performing analog space-time relay of an information signal transmitted from a source station to a destination station over a wireless communication relay channel, the apparatus comprising:
(i) a first relay antenna configured to receive a first symbol sequence which includes the information signal and a first noise element; and
(ii) a second relay antenna configured to receive a second symbol sequence which includes the information signal and a second noise element;
wherein, the first antenna is configured to transmit a first signal which is associated with the second symbol sequence received at the second relay antenna; and
wherein the second antenna is configured to transmit a second signal which is associated with the first symbol sequence received at the first relay antenna.

56. Apparatus according to claim 55, wherein the apparatus is in the form of a relay station and the first and second antennas are co-located at the relay station.

57. Apparatus according to claim 55 wherein the apparatus includes two relay stations and the first and second antennas are located at separate relay stations.

58. Apparatus according to claim 55, wherein the information signal from the source further comprises a cyclic prefix, the apparatus further comprising:
- a processing unit for removing part of the cyclic prefix at the relay station; and
- a transmitter for transmitting the remaining part of the cyclic prefix and the message to the destination.

59. Apparatus according to claim 55,
wherein the information signal from the source further comprises a cyclic prefix, the apparatus further comprising:
- a processing unit configured to remove the cyclic prefix, generate a second cyclic prefix, append the second cyclic prefix to the message; and transmit the message with the appended second cyclic prefix to the destination.

60. Apparatus for performing analog space-time relay of an information signal transmitted from a source station to a destination station over a wireless communication relay channel, the apparatus comprising:
- (i) a first relay antenna configured to receive a first symbol sequence and to retransmit the first symbol sequence as a first signal, the first symbol sequence comprising the information signal and a first noise element;
- (ii) a second relay antenna configured to receive a second symbol sequence which includes the information signal and a second noise element; the second relay antenna further configured to transmit a second signal which is a reordering of the second symbol sequence.

* * * * *